United States Patent
Matsen et al.

(10) Patent No.: US 12,285,887 B2
(45) Date of Patent: Apr. 29, 2025

(54) INDUCTIVELY HEATED SLIP SHEET AND METHODS OF USING

(71) Applicant: The Boeing Company, Chicago, IL (US)

(72) Inventors: Marc R. Matsen, Seattle, WA (US); Karl Marius Nelson, Issaquah, WA (US); Bret Alan Mcginness Voss, Seattle, WA (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 17/653,624

(22) Filed: Mar. 4, 2022

(65) Prior Publication Data
US 2022/0396012 A1 Dec. 15, 2022

Related U.S. Application Data

(60) Provisional application No. 63/210,138, filed on Jun. 14, 2021.

(51) Int. Cl.
*B29C 35/00* (2006.01)
*B29C 35/08* (2006.01)
(Continued)

(52) U.S. Cl.
CPC .......... *B29C 35/0805* (2013.01); *B29C 70/34* (2013.01); *B29C 70/549* (2021.05);
(Continued)

(58) Field of Classification Search
CPC ... B29C 70/549; B29C 70/34; B29C 35/0805; B29C 2035/0816; B29L 2031/3076
See application file for complete search history.

(56) References Cited

U.S. PATENT DOCUMENTS 9,314,975 B1 * 4/2016 Matsen ................. B29C 70/42
10,828,851 B2 11/2020 Kismarton et al.
(Continued)

FOREIGN PATENT DOCUMENTS

EP 3406412 A1 11/2018
EP 3666487 A1 * 6/2020 ............. B29C 33/06

OTHER PUBLICATIONS

"COMPRO Simulation Software," Convergent Manufacturing Technologies Inc., copyright 2017, Accessed Jul. 28, 2017, 2 pages. http://www.convergent.ca/products/compro-simulation-software.
(Continued)

*Primary Examiner* — Nicholas R Krasnow
(74) *Attorney, Agent, or Firm* — Yee & Associates, P.C.

(57) ABSTRACT

An induction curing system comprises a slip sheet and a power supply. The slip sheet comprises a layup surface configured to receive a composite material, a tool interface surface configured to interface with an upper surface of a tool, a rigid body extending between the layup surface and the tool interface surface, and an induction coil circuit within the rigid body of the slip sheet. The induction coil circuit is configured to heat the layup surface to a temperature sufficient to cure the composite material. The induction coil circuit has a diameter selected to generate heat using a power supply having a frequency below 150 kHz. The rigid body is configured to support the composite material during transport of the composite material. The power supply is coupled with the induction coil circuit, the power supply is selected based on the diameter of the induction coil circuit.

23 Claims, 10 Drawing Sheets

(51) Int. Cl.
  *B29C 70/34* (2006.01)
  *B29C 70/54* (2006.01)
  *B29L 31/30* (2006.01)

(52) U.S. Cl.
  CPC ............... *B29C 2035/0816* (2013.01); *B29L 2031/3076* (2013.01)

(56) References Cited

U.S. PATENT DOCUMENTS

| | | |
|---|---|---|
| 2011/0031433 A1 | 2/2011 | Burchell |
| 2014/0322381 A1 | 10/2014 | Bland |
| 2016/0009035 A1* | 1/2016 | Zarfos ................. B29C 35/0272 156/64 |
| 2016/0325468 A1 | 11/2016 | Foss et al. |
| 2019/0030839 A1* | 1/2019 | Kismarton .............. B29C 70/30 |

OTHER PUBLICATIONS

Office Action dated Feb. 6, 2020 regarding U.S. Appl. No. 15/662,969; 12 pgs.
Notice of Allowance dated Aug. 11, 2020 regarding U.S. Appl. No. 15/662,969; 9 pgs.
European Patent Office Extended Search Report, dated Oct. 7, 2022, regarding Application No. EP22164985.8, 6 pages.

* cited by examiner

INDUCTIVELY HEATED SLIP SHEET AND METHODS OF USING

CROSS-REFERENCE TO RELATED APPLICATION

This application claims the benefit of U.S. Provisional Patent Application Ser. No. 63/210,138, filed Jun. 14, 2021, and entitled "Inductively Heated Slip Sheet and Methods Of Using;" which is incorporated herein by reference in its entirety.

BACKGROUND INFORMATION

1. Field

The present disclosure relates generally to composite manufacturing and more specifically to curing composite materials using an inductively heated slip sheet.

2. Background

A composite part may be cured in an oven or an autoclave where heat is applied to the part while supported on a cure tool that maintains the shape of the part during the curing process. Techniques have been developed for curing composite parts without the need for an oven or autoclave, however these techniques have been limited to curing relatively small parts and/or require relatively complicated and/or expensive tooling.

Therefore, it would be desirable to have a method and apparatus that takes into account at least some of the issues discussed above, as well as other possible issues. For example, it would be desirable to have a method and apparatus for curing composite parts out-of-autoclave that employ relatively simple and inexpensive cure tooling.

SUMMARY

An embodiment of the present disclosure provides a method of forming a composite part. A composite material is laid up on a layup surface of a slip sheet positioned on a layup support. The composite material that has been laid up on the slip sheet is transported to a tool, wherein the slip sheet comprises a rigid body configured to support the composite material during transport. The slip sheet is secured to the tool such that a tool interface surface of the slip sheet is in contact with an upper surface of the tool. The composite material on the slip sheet is cured using heat generated by an induction coil circuit within the rigid body of the slip sheet while the slip sheet is secured to the tool.

Another embodiment of the present disclosure provides an induction curing system. The induction curing system comprises a slip sheet and a power supply. The slip sheet comprises a layup surface configured to receive a composite material, a tool interface surface configured to interface with an upper surface of a tool, a rigid body extending between the layup surface and the tool interface surface, and an induction coil circuit within the rigid body of the slip sheet. The rigid body is configured to support the composite material during transport of the composite material. The induction coil circuit is configured to heat the layup surface to a temperature sufficient to cure the composite material. The induction coil circuit has a diameter selected to generate heat using a power supply having a frequency below 150 kHz. The power supply is coupled with the induction coil circuit. The power supply is selected based on the diameter of the induction coil circuit.

Yet another embodiment of the present disclosure provides an induction curing system. The induction curing system comprises a slip sheet. The slip sheet comprises a layup surface configured to receive a composite material, a tool interface surface configured to interface with an upper surface of a tool, a body extending between the layup surface and the tool interface surface, and an induction coil circuit within the body of the slip sheet. The induction coil circuit is configured to heat the layup surface to a temperature sufficient to cure the composite material. The induction coil circuit comprises a conductor for receiving electrical current and generating a magnetic field in response to the electrical current and a susceptor wire wound along at least a portion of a length of the conductor. The susceptor wire has a diameter of greater than 0.05 inches.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
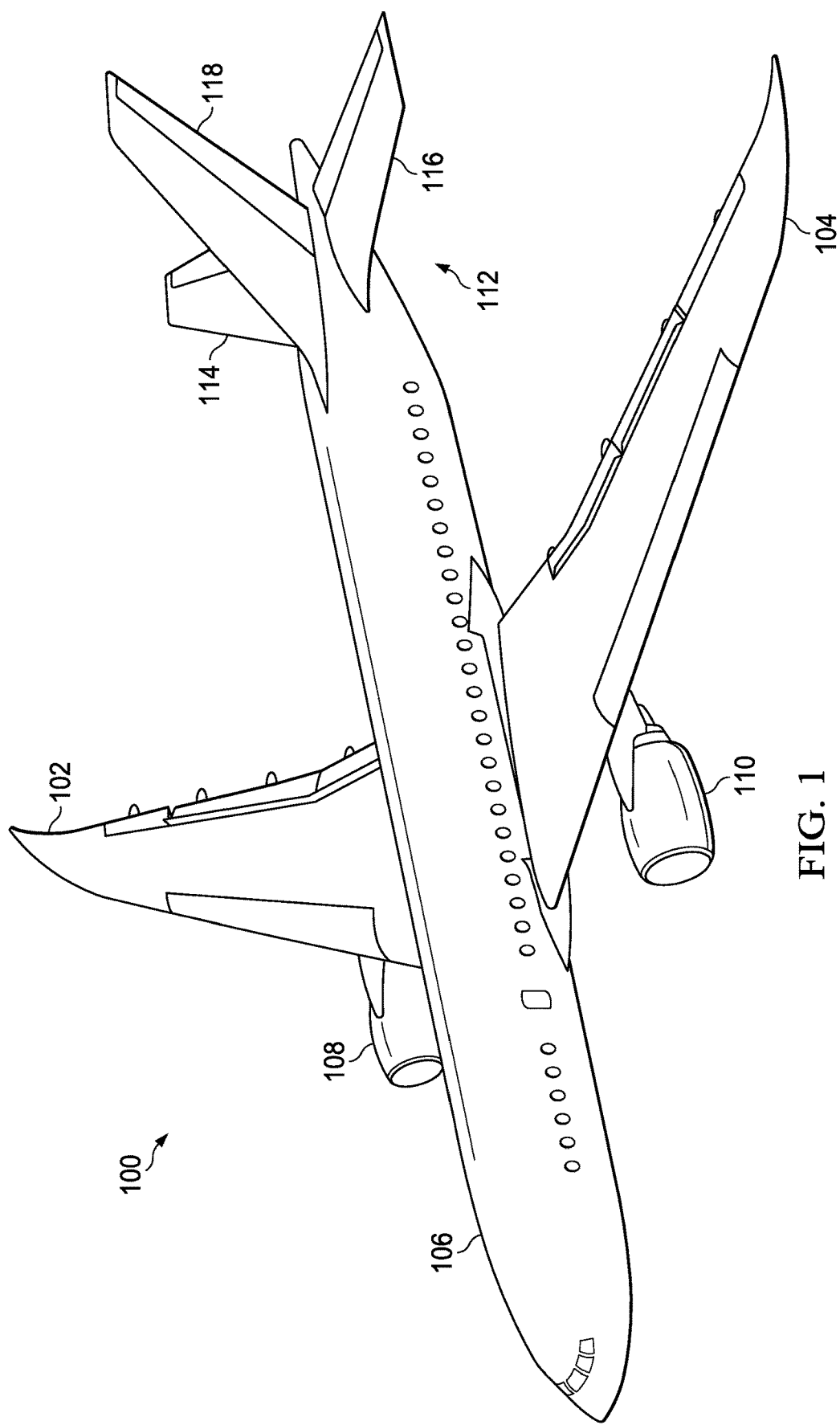
FIG. 1 is an illustration of an aircraft is depicted in accordance with an illustrative embodiment.

The illustrative examples recognize and take into account one or more different considerations. The illustrative examples recognize and take into account that in manufacturing composite structures, layers of composite material are typically laid up on a tool. The layers may be laid up in the form of tape, tows, or other suitable forms. In some cases, resin may be infused or pre-impregnated into the fiber layers. Composite materials with resin pre-impregnated are commonly referred to as prepreg.

The different layers of prepreg may be laid up in different orientations and different numbers of layers may be used depending on the thickness of the composite structure being manufactured. These layers may be laid up using automated lamination equipment such as a tape laminating machine or a fiber placement system.

For thermoset composite materials, after the different layers have been laid up on the tool, the layers of composite material are cured. Thermoset composite materials are cured upon exposure to at least one of temperature and pressure, thus forming the final composite structure.

The illustrative examples recognize and take into account that for large composites, the composite layers may be laid up and cured on the same tool. A tool that is used in curing thermoset composite materials is configured to withstand curing temperatures and pressures and may be referred to as "high heat capacity tool." The illustrative examples recognize and take into account that high heat capacity tools are high-cost tools. The illustrative examples recognize and take into account that making multiple high heat capacity tools is a large up-front investment.

The illustrative examples recognize and take into account that laying up composite material using automated lamination equipment is time-consuming. The illustrative examples recognize and take into account that having downtime for automated lamination equipment is inefficient and expensive. The illustrative examples recognize and take into account that laying up composite material and curing the composite material on the same high heat capacity tool can result in downtime for the automated lamination equipment. The illustrative examples recognize and take into account that laying up composite material and curing the composite material on the same high heat capacity tool can result in reduced throughput.

A composite part can be cured in an oven or an autoclave where heat is applied to the part while supported on a cure tool that maintains the shape of the part during the curing process. The illustrative examples recognize and take into account that curing the composite material using an autoclave may use at least one of undesirable amount of time or an undesirable amount of energy.

The illustrative examples recognize and take into account that techniques have been developed for curing composite parts without the need for an oven or autoclave, however these techniques have been limited to curing relatively small parts and/or require relatively complicated and/or expensive tooling.

The illustrative examples recognize and take into account that it may be desirable to layup and cure the composite material on two different tools. By having a dedicated layup location, downtime for the automated lamination equipment can be reduced.

The illustrative examples recognize and take into account that moving composite materials between tools may be accomplished using "pick and place" tooling. The illustrative examples also recognize and take into account that for large composite layups, it may not be possible to move the composite layup using pick and place equipment. Moving large composite layups between tools may use movement equipment that is at least one of undesirably complicated or undesirably expensive.

The illustrative examples recognize and take into account that it may be desirable to utilize power supplies with lower frequencies. The illustrative examples recognize and take into account that power supplies that provide electrical current with a frequency in the range of 20-100 kHz are cheaper. The illustrative examples recognize and take into account that power supplies that provide electrical current with a frequency under 9 kHz is below the FCC regulated band.

The illustrative examples recognize and take into account that there is also a need for a method and apparatus of the type mentioned above that is well suited for curing relatively large-scale parts out of-autoclave using induction heating and smart susceptors to provide precise and uniform temperature control during the curing process. The illustrative examples recognize and take into account that there is also a need for tooling to transfer large composite layups between a layup support and a cure tool.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having large composite components that can be manufactured using an inductively heated slip sheet and methods of use. For example, portions of body 106, wing 102, or wing 104 can be manufactured using the illustrative examples of an inductively heated slip sheet and methods of use.

Figure 2:
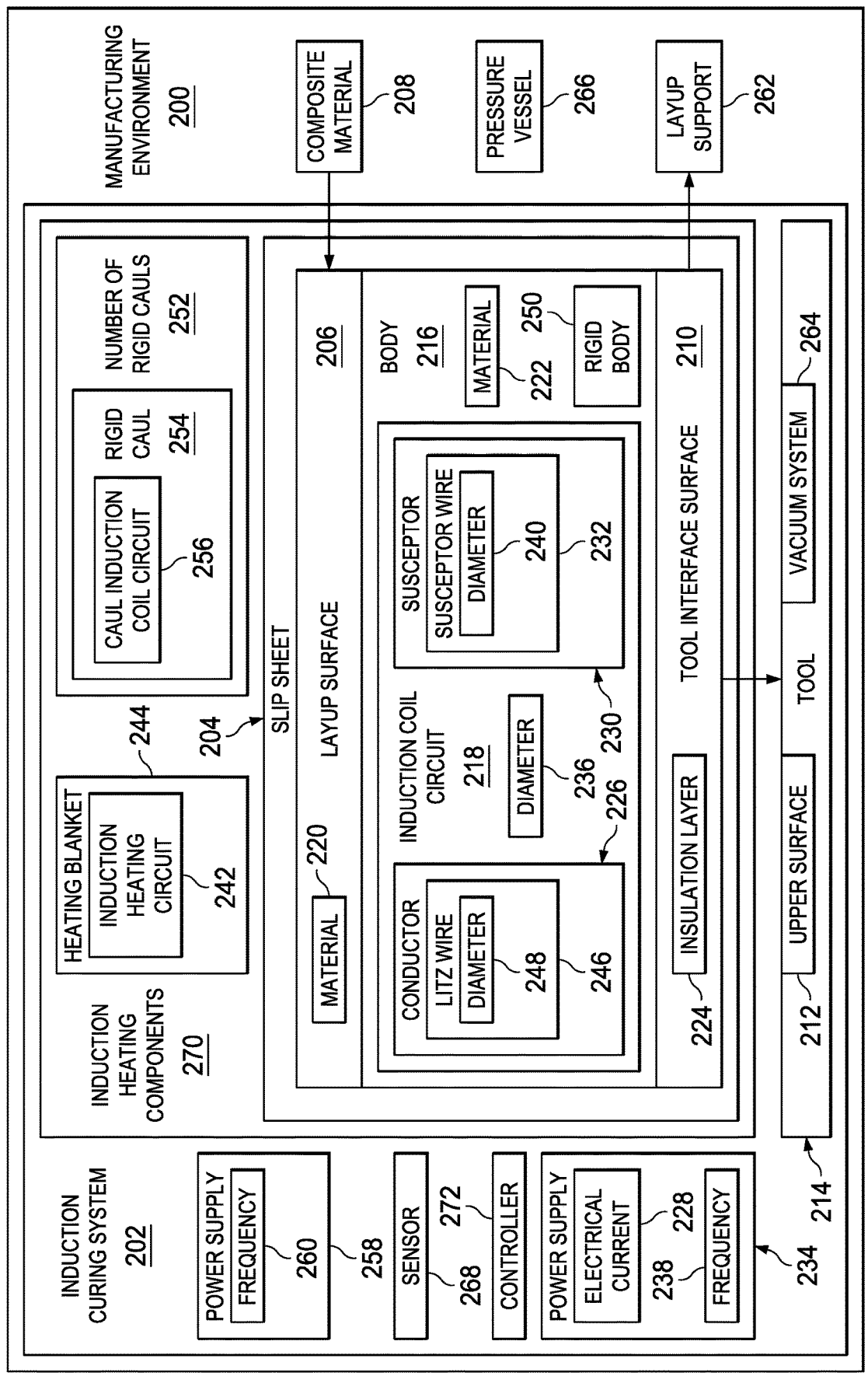
FIG. 2 is an illustration of a block diagram of a manufacturing environment in which an illustrative embodiment may be implemented.

Turning now to FIG. 2, an illustration of a block diagram of a manufacturing environment is depicted in which an illustrative embodiment may be implemented. Manufacturing environment 200 is a manufacturing environment in which a component of aircraft 100 can be manufactured. For example, a portion of body 106, wing 102, or wing 104 could be manufactured using induction curing system 202 in manufacturing environment 200.

Induction curing system 202 comprises slip sheet 204. Slip sheet 204 comprises layup surface 206 configured to receive composite material 208, tool interface surface 210 configured to interface with upper surface 212 of tool 214, body 216 extending between layup surface 206 and tool interface surface 210, and induction coil circuit 218 within body 216 of slip sheet 204. Induction coil circuit 218 is configured to heat layup surface 206 to a temperature sufficient to cure composite material 208.

Layup surface 206 has a shape configured to be an outer mold line for composite material 208. Layup surface 206 is formed of material 220. Layup surface 206 is formed of any desirable material for layup of composite material 208. Layup surface 206 is formed of material 220 that will not undesirably interact with composite material 208. In some illustrative examples, composite material 208 is laid directly onto layup surface 206. In other illustrative examples, a release layer or other layer of material is positioned between composite material 208 and layup surface 206.

Composite material 208 is cured on slip sheet 204. Layup surface 206 is formed of material 220 configured to withstand curing temperatures and curing pressures of composite material 208.

In some illustrative examples, material 220 is the same as material 222 of body 216. In these illustrative examples, layup surface 206 is an outer surface of body 216.

In some illustrative examples, material 220 forming layup surface 206 is different than material 222 forming body 216. In these illustrative examples, layup surface 206 is a layer of material 220 coupled to material 222 of body 216. When material 220 is different than material 222, material 220 is present in slip sheet 204 to provide desirable material properties. In some illustrative examples, material 220 is present to provide an increased useable life for slip sheet 204. In some illustrative examples, material 220 is present to increase durability and decrease the wear to layup surface 206 through repeated uses. In some illustrative examples, material 220 is a metal coupled to material 222 to increase the useable life of slip sheet 204.

Tool interface surface 210 is configured to contact upper surface 212 of tool 214. Tool interface surface 210 is a mirror image of upper surface 212 of tool 214. In some illustrative examples, tool interface surface 210 is an outer surface of body 216. In these illustrative examples, tool interface surface 210 is formed of material 222.

In other illustrative examples, tool interface surface 210 is formed of a material other than material 222. In some illustrative examples, tool interface surface 210 is formed of insulation layer 224. When present, insulation layer 224 is disposed on tool interface surface 210 to minimize heat loss to tool 214 and improve the heating efficiency of slip sheet 204. When present, insulation layer 224 is disposed on tool interface surface 210 to reduce transfer of heat to tool 214. When present, insulation layer 224 may include any suitable insulation, such as, without limitation, silicone.

Slip sheet 204 is secured to tool 214 during curing of composite material 208. Tool 214 is configured to withstand curing temperatures and curing pressures of composite material 208. Tool 214 may be referred to as "high heat capacity tool," due to its use in curing thermoset composite materials. High heat capacity tools may be more expensive to manufacture than tools that are not manufactured to withstand curing temperatures and pressures. For example, tools that are not configured to withstand elevated temperatures and pressures may be formed of less expensive materials. For example, tools that are not configured to withstand elevated temperatures and pressures may be formed using less expensive manufacturing methods.

During curing of composite material 208, induction coil circuit 218 in slip sheet 204 generates heat to cure composite material 208. Induction coil circuit 218 comprises conductor 226 for receiving electrical current 228 and generating a magnetic field in response to electrical current 228. Induction coil circuit 218 further comprises susceptor 230. In some illustrative examples, susceptor 230 comprises susceptor wire 232 wound along at least a portion of a length of conductor 226.

Characteristics of induction coil circuit 218 are selected based on at least one of: a desired temperature to cure composite material 208, desired parameters for power supply 234, and a design for body 216 of slip sheet 204. Induction coil circuit 218 is designed to generate heat such that layup surface 206 reaches a temperature sufficient to cure composite material 208. Susceptor 230 is formed of a material selected to have a Curie temperature sufficient to cure composite material 208.

Susceptor 230 may extend along a length of the conductor 226 within body 216. The application of electrical current 228 to the conductor 226 produces an alternating magnetic field. The magnetic field is absorbed by the material from which susceptor 230 is formed causing susceptor 230 to be inductively heated.

The flow of electrical current 228 through conductor 226 results in the generation of the magnetic field surrounding susceptor 230. Eddy currents generated within susceptor 230 as a result of exposure thereof to the magnetic field causes inductive heating of susceptor 230. The magnetic material from which susceptor 230 is formed preferably has a high magnetic permeability and a Curie temperature that corresponds to the desired temperature to which composite material 208 is to be heated by slip sheet 204. Susceptor 230 and conductor 226 are preferably sized and configured such that at temperatures below the Curie temperature of the magnetic material, the magnetic field is concentrated in susceptor 230 due to the magnetic permeability of the material.

As a result of the close proximity of susceptor 230 to conductor 226, the concentration of the magnetic field results in relatively large eddy currents in susceptor 230. The induced eddy currents result in resistive heating of susceptor 230. Susceptor 230 conductively heats body 216 and composite material 208 in thermal contact with layup surface 206. The heating of susceptor 230 continues during application of electrical current 228 until the magnetic material approaches the Curie temperature. Upon reaching the Curie temperature, susceptor 230 becomes non-magnetic at which point the magnetic fields are no longer concentrated in susceptor 230. The induced eddy currents and associated resistive heating diminishes to a level sufficient to maintain the temperature of susceptor 230 at the Curie temperature.

Conductor 226 may extend through body 216 in a meandering pattern, a serpentine pattern, a circular coil formation or in any other desirable pattern. In other illustrative examples, conductor 226 may form part of the warp and weft of reinforcing fibers in body 216 of slip sheet 204. Conductor 226 is connected to power supply 234 for generating electrical current 228. Electrical current 228 may have frequency 238 of between approximately 1 kHz and 300 kHz, and an amperage of between approximately 1 amp and 1000 amps at a voltage of between approximately 10 volts and 300 volts although the current may be provided in frequencies, amperages, and voltages outside of such ranges. In an illustrative example, electrical current 228 has frequency 238 of 150 kHz or less. In an illustrative example, electrical current 228 has frequency 238 of 100 kHz or less. In an illustrative example, electrical current 228 has frequency 238 of 9 kHz or less.

Susceptor wire 232 is spirally wound along the length of conductor 226 or along any portion thereof. The spirally wound susceptor wire 232 may comprise a succession of wire wraps along at least a portion of a length of conductor 226. In some illustrative examples, susceptor wire 232 is wound around conductor 226 such that adjacent ones of the wraps define a gap, therebetween of no less than approximately 20 percent of diameter 240 of susceptor wire 232.

Susceptor wire 232 is spirally wound along at least a portion of a length of conductor 226 and comprises a succession of wire wraps defining gaps therebetween such that a circumferential location on each wire wrap is spaced apart from an adjacent wire wrap at the same circumferential location. The magnetic field passing through the gaps between the wire wraps and thereby promoting flow of eddy currents within susceptor wire 232. Susceptor wire 232 is comprised of magnetic material having a Curie temperature, susceptor wire 232 is inductively heated in response to the magnetic field.

Susceptor wire 232 is preferably electrically isolated from conductor 226 and may also be substantially coaxially mounted on conductor 226. In some illustrative examples, susceptor wire 232 may be non-coaxially mounted to conductor 226. Susceptor wire 232 may be maintained in fixed position relative to conductor 226 due to a matrix material (not depicted) forming a portion of induction coil circuit 218. Susceptor wire 232 may be maintained in fixed position relative to conductor 226 due to encasement of the susceptor wire 232 within material 222. In some illustrative examples, susceptor wire 232 is electrically isolated from conductor 226 by material 222 which preferably has a relatively high thermally conductivity and a relatively low electrical conductivity. Material 222 is selected from any desirable material that has a sufficient rigidity and desirable thermal conductivity. In some illustrative examples, material 222 is a cured composite material.

The thermoset composite material 222 of body 216 comprises a thermosetting resin and reinforcing fibers. The reinforcing fibers can include at least one of graphite fibers, fiberglass fibers, or any other desirable reinforcing fiber.

The magnetic material from which susceptor wire 232 may be formed may be selected from at least one of nickel, iron cobalt, molybdenum, chromium, or other desirable magnetic materials having a Curie temperature that is compatible with the curing temperature of composite material 208. Susceptor wire 232 can be formed as single strand of wire, as braided wire, or in any other desired design that may be spirally wound around conductor 226.

Induction coil circuit 218 is designed to fit within body 216. Induction coil circuit 218 has diameter 236. Diameter 236 is small enough to fit within body 216. Induction coil circuit 218 is positioned within body 216 in any desirable fashion. In some illustrative examples, induction coil circuit 218 is positioned in a meandering pattern, in a serpentine pattern, in a circular coil formation or in any other arrangement that facilitates the desired spacing between adjacent portions of conductor 226.

In some illustrative examples, induction coil circuit 218 is designed to select desirable parameters for power supply 234. Slip sheet 204 is configured to be sufficiently rigid to transport composite material 208. Accordingly, induction coil circuit 218 can be designed independent of flexibility of induction coil circuit 218. Induction coil circuit 218 can have a larger diameter, diameter 236, than of a flexible heating circuit, such as induction heating circuit 242 of heating blanket 244.

The sizes of components of induction coil circuit 218, including conductor 226 and susceptor 230, are based on several assumptions. In some illustrative examples, scaling induction coil circuit 218 is based on the following assumptions: diameter 240 of susceptor 230 is five times skin depth at 20 C; lower frequency 238 electrical current 228 uses an inversely higher magnetic field to produce the same power; and a high magnetic field scales linearly with electrical current 228 and cross section of Litz wire 246. Diameter 240 of susceptor 230 directly affects an amount of heat generated by susceptor 230 and the change in heat output at the Curie temperature of the heating. Large diameter susceptors (>20 times skin depth) will heat very efficiently and provide the most heat since heat is based on susceptor volume. However, large diameters will not show much change in heat output with increase in temperature at Curie point. Small diameter susceptors (<2 times skin depth) will have a strong change in heating at Curie point, but will not output much heat because of a smaller volume of susceptor material. Five times skin depth can provide a balance between a change in heat at Curie temperature and provide sufficient heat to get up to temperature when the part is acting as a heat sink. In some other illustrative examples, a different ratio for diameter 240 may be different.

Materials and sizes of components of induction coil circuit 218 are selected based on at least one of the temperature desired to cure composite material 208, the dimensions of body 216, and electrical current 228 to be delivered. In some illustrative examples, conductor 226 is selected to use power supply 234 having at least one of a lower cost or fewer regulations. For example, diameter 248 and material of conductor 226 can be selected to utilize power supply 234 providing electrical current 228 with a frequency of 150 kHz or less. In some illustrative examples, diameter 248 and material of conductor 226 can be selected to utilize power supply 234 providing electrical current 228 with a frequency of 100 kHz or less. Utilizing a power supply providing current with a frequency of 100 kHz or less can reduce the cost of power supply 234. In some illustrative examples, diameter and material of conductor 226 can be selected to utilize power supply 234 providing current with a frequency of 9 kHz or less. A power supply providing current with a frequency of 9 kHz or less may have fewer regulations. In some illustrative examples, power supply 234 coupled with induction coil circuit 218 is selected based on diameter 236 of induction coil circuit 218.

In some illustrative examples, conductor 226 takes the form of Litz wire 246. In some illustrative examples, diameter 248 of Litz wire 246 is selected to set desired characteristics for power supply 234. In some illustrative examples, diameter 248 of Litz wire 246 is selected such that power supply 234 is a lower cost power supply with frequency 238 in the range of 20-100 kHz. In some illustrative examples, Litz wire 246 has diameter 240 of approximately 0.111 inches. In some illustrative examples, diameter 248 of Litz wire 246 is selected such that power supply 234 is an unregulated power supply with frequency 238 below 9 kHz. In some illustrative examples, Litz wire 246 has diameter 240 of approximately 0.235 inches.

In some illustrative examples, diameter 240 of susceptor wire 232 is selected to set desired characteristics for power supply 234. In some illustrative examples, diameter 240 of susceptor wire 232 is selected such that power supply 234 is a lower cost power supply with frequency 238 in the range of 20-100 kHz. In some illustrative examples, susceptor wire 232 has a diameter in the range of 0.03 to 0.07 inches. In some illustrative examples, diameter 240 of susceptor wire 232 is selected such that power supply 234 is an unregulated power supply with frequency 238 below 9 kHz. In some illustrative examples, susceptor wire 232 has a diameter of greater than 0.05 inches.

Slip sheet 204 comprises rigid body 250 extending between layup surface 206 and tool interface surface 210.

Rigid body 250 is configured to support composite material 208 during transport of composite material 208. Induction coil circuit 218 is within rigid body 250 of slip sheet 204. Induction coil circuit 218 is configured to heat layup surface 206 to a temperature sufficient to cure composite material 208. Induction coil circuit 218 has diameter 236 selected to generate heat using power supply 234 having a frequency below 150 kHz. Power supply 234 is coupled with induction coil circuit 218. Power supply 234 is selected based on diameter 236 of induction coil circuit 218.

In some illustrative examples, slip sheet 204 further comprises insulation layer 224 connected to rigid body 250 of slip sheet 204. In these illustrative examples, insulation layer 224 forms tool interface surface 210.

In some illustrative examples, induction curing system 202 further comprises number of rigid cauls 252. Number of rigid cauls 252 can be used to form an inner mold line of composite material 208. When present, number of rigid cauls 252 is used to form a second surface of composite material 208 opposite the first surface of composite material 208 formed on layup surface 206. In these illustrative examples, composite material is positioned between layup surface 206 and number of rigid cauls 252. As used herein, "a number of," when used with reference to items means one or more items. Thus, number of rigid cauls 252 comprises one or more rigid cauls.

As depicted, number of rigid cauls 252 comprises rigid caul 254. Rigid caul 254 includes caul induction coil circuit 256 within a rigid body of rigid caul 254. In this illustrative example, caul induction coil circuit 256 is configured to heat rigid caul 254. In some illustrative examples, rigid caul 254 heats composite material 208 during curing of composite material 208 using caul induction coil circuit 256. In some illustrative examples, curing composite material 208 includes heating by induction coil circuit 218 and caul induction coil circuit 256.

In some illustrative examples, induction curing system 202 comprises heating blanket 244 conformable to composite material 208. Heating blanket 244 comprises induction heating circuit 242. To conform to composite material 208, induction heating circuit 242 is flexible. Sizing of components of induction heating circuit 242 is based on the desired flexibility of induction heating circuit 242 and heating blanket 244.

In some illustrative examples, caul induction coil circuit 256 is configured to utilize power supply 234. Rigidity of rigid caul 254 allows for caul induction coil circuit 256 to have a larger diameter than induction heating circuit 242. In some illustrative examples, caul induction coil circuit 256 is configured to utilize a power supply with a current with a lower frequency than power supply 258 configured to provide an electrical current with frequency 260 to induction heating circuit 242.

Flexibility of induction heating circuit 242 limits frequency 260 of power supply 258. In some illustrative examples, frequency 238 of electrical current 228 provided by power supply 234 is lower than frequency 260 of electrical current provided by power supply 258.

To layup composite material 208, slip sheet 204 is initially present on layup support 262. Composite material 208 is laid up on layup surface 206 by any desirable automated composite layup tool. After composite material 208 is laid up on layup surface 206, slip sheet 204 is removed from layup support 262.

In some illustrative examples, number of rigid cauls 252 is placed onto composite material 208 prior to removing slip sheet 204 from layup support 262. In other illustrative examples, number of rigid cauls 252 is placed onto composite material 208 after slip sheet 204 holding composite material 208 is transported off of layup support 262.

In some illustrative examples, heating blanket 244 is placed over composite material 208 prior to removing slip sheet 204 from layup support 262. In other illustrative examples, heating blanket 244 is placed over composite material 208 after slip sheet 204 holding composite material 208 is transported off of layup support 262.

Slip sheet 204 supporting composite material 208 is then placed in contact with tool 214 and secured to tool 214. Slip sheet 204 is secured to tool 214 in any desirable fashion. In some illustrative examples, slip sheet 204 is secured to tool 214 using a mechanical system. In some other illustrative examples, tool 214 further comprises vacuum system 264 configured to restrain slip sheet 204 relative to upper surface 212 of tool 214. Vacuum system 264 can include holes, channels, or any other desirable type of vacuum distribution system in tool 214.

If number of rigid cauls 252 is present, number of rigid cauls 252 is placed on composite material 208 prior to curing composite material 208. If heating blanket 244 is present, heating blanket 244 is placed on composite material 208 prior to curing composite material 208.

After securing slip sheet 204 to tool 214, electrical current 228 is provided to induction coil circuit 218. Induction coil circuit 218 comprises conductor 226 for receiving electrical current 228 and generating a magnetic field in response to electrical current 228. Susceptor wire 232 spirally wound along at least a portion of a length of conductor 226 is inductively heated in response to the magnetic field.

Induction curing system 202 can be used to cure composite material 208 without the need for an oven, autoclave or similar large, heating enclosure. In some illustrative examples, induction curing system 202 is used within pressure vessel 266. In other illustrative examples, induction curing system 202 is used with a vacuum bagging system.

Composite material 208 is then rapidly heated to the curing step while pneumatic pressure is applied as dictated by the appropriate cure kinetics model. The smart susceptor, susceptor 230, provides thermal leveling at the prescribed cure temperature. Lite circulation of the ambient temperature gaseous pressurization medium in the cure vessel, pressure vessel 266, sweeps away any exothermic evolved heat during the cure while susceptor 230 continues to drive the temperature of slip sheet 204 to the desired cure temperature.

Once the desired state of cure is achieved in composite material 208, the resulting composite part can be rapidly cooled down since the body of tool 214 is not heated and the gas in pressure vessel 266 is at ambient temperature. The composite part formed of composite material 208 and slip sheet 204 are then removed from the pressure vessel 266 and debagging occurs with the parts then sent to inspection and trim.

Induction curing system 202 broadly comprises slip sheet 204 supported on tool 214, number of rigid cauls 252, and heating blanket 244. In the illustrated examples, composite material 208 can be substantially flat, or have one or more curvatures or contours. Composite material 208 may comprise, for example and without limitation, laminated plies of fiber reinforced polymer resin, such as, without limitation, carbon fiber epoxy or other thermosets that must be heated to a preselected temperature in order to effect curing.

Induction curing system 202 can include one or more thermal sensors. One or more sensors, such as sensor 268, can be included for sensing temperatures of at least one of heating blanket 244, slip sheet 204, number of rigid cauls 252, or composite material 208.

One or more controllers can be included in induction curing system 202 to control the operation of each induction heating component of induction heating components 270. For example, controller 272 can regulate frequency 238 of electrical current 228 applied to induction coil circuit 218 as a means to alter or control the rate of heating of susceptor 230 and thereby control the rate of heating of composite material 208. A single controller, controller 272 can be provided to coordinate the operation of induction heating components 270 although each induction heating component may have a dedicated controller.

The illustration of induction curing system 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, number of rigid cauls 252 includes a different quantity of rigid cauls. In some illustrative examples, number of rigid cauls 252 includes more than one rigid caul. In some illustrative examples, at least one rigid caul of number of rigid cauls 252 does not include an induction coil circuit. In some illustrative examples, number of rigid cauls 252 does not provide heat for curing composite material 208.

In some illustrative examples, number of rigid cauls 252 is optional. In these illustrative examples, heating blanket 244 can be placed directly onto composite material 208.

Although not displayed in FIG. 2, a vacuum bag assembly may be installed over heating blanket 244. The vacuum bag assembly may include a bagging film covering heating blanket 244 and which may be sealed to one of layup surface 206 of slip sheet 204 or upper surface 212 of tool 214. A vacuum probe and vacuum gauge may extend from the bagging film to a vacuum generator to provide a means for drawing a vacuum on the bagging film for application of pressure and to draw out volatiles and other gasses that may be generated as a result of heating uncured composite material 208. Drawing a vacuum on the bagging film can be performed in order to compact composite material 208 against slip sheet 204 during the curing process.

Although slip sheet 204 is depicted as having induction coil circuit 218, slip sheet 204 has any desirable quantity of induction coil circuits. In some illustrative examples, slip sheet 204 has multiple induction coil circuits having different Curie temperatures. In some illustrative examples, slip sheet 204 has independently controlled induction coil circuits for localized heating of composite material 208 on slip sheet 204.

In some illustrative examples, slip sheet 204 comprises a second induction coil circuit. In these illustrative examples, induction coil circuit 218 comprises conductor 226 and susceptor wire 232 having a first Curie temperature, and second induction coil circuit comprises a second conductor and a second susceptor wire having a second Curie temperature. In these illustrative examples, the first Curie temperature is different than the second Curie temperature. In some illustrative examples, the first Curie temperature is a curing temperature and wherein the second Curie temperature is a layup temperature.

Figure 3:
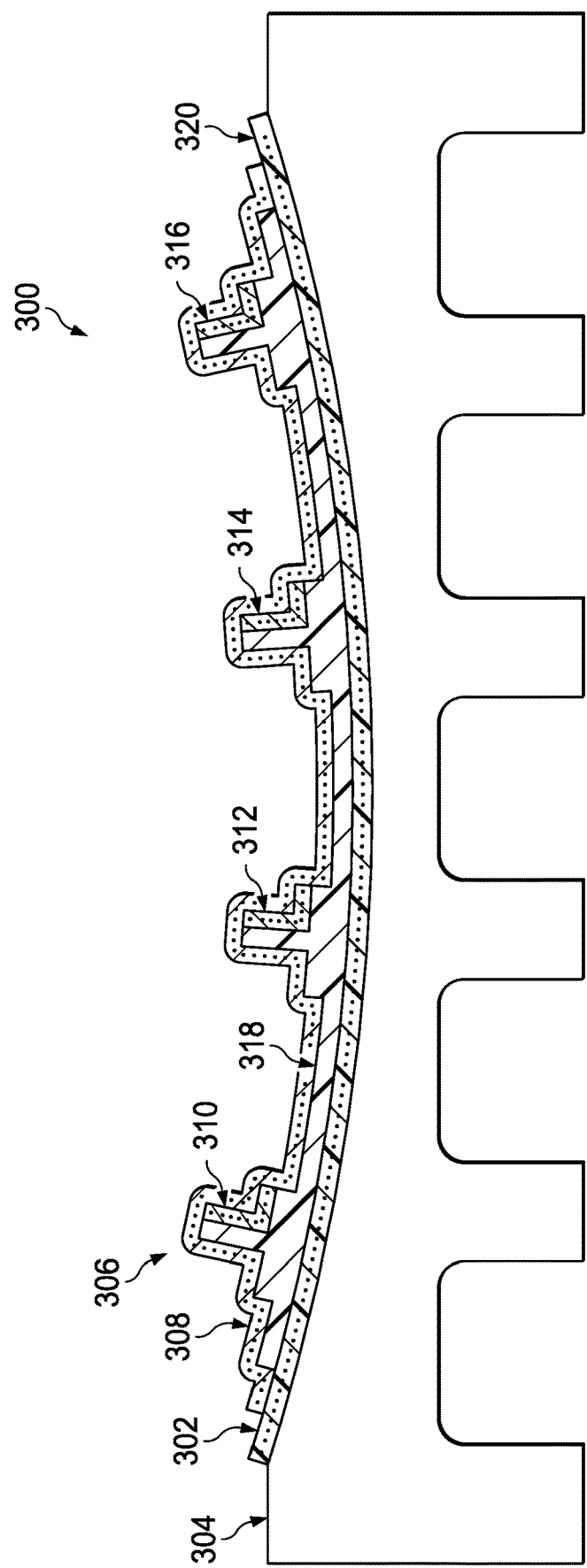
FIG. 3 is an illustration of a composite part within an induction curing system in accordance with an illustrative embodiment.

Turning now to FIG. 3, an illustration of a composite part within an induction curing system is depicted in accordance with an illustrative embodiment. Induction curing system 300 is a physical implementation of induction curing system 202 of FIG. 2. Induction curing system 300 includes slip sheet 302, tool 304, number of rigid cauls 306, and heating blanket 308. Slip sheet 302 is a physical implementation of slip sheet 204 of FIG. 2. Tool 304 is a physical implementation of tool 214 of FIG. 2. Number of rigid cauls 306 is a physical implementation of number of rigid cauls 252 of FIG. 2. Heating blanket 308 is a physical implementation of heating blanket 244 of FIG. 2.

As depicted, number of rigid cauls 306 includes rigid caul 310, rigid caul 312, rigid caul 314, and rigid caul 316. As depicted, each of number of rigid cauls 306 includes at least one respective inductive circuit. Each of number of rigid cauls 306 can be inductively heated by at least one inductive circuit present in the respective rigid caul. Number of rigid cauls 306 may be referred to as a number of inductively heated rigid cauls.

Composite material 318 is positioned on slip sheet 302. Composite material 318 was laid up on layup surface 320 of slip sheet 302. Composite material 318 is cured on layup surface 320 of slip sheet 302. During curing of composite material 318, slip sheet 302 is inductively heated to cure composite material 318 on layup surface 320.

Heating blanket 308 is flexible and conformable to composite material 318. Due to the flexible, conformable nature of heating blanket 308, its outer periphery drapes down over the outer edges of composite material 318 and effectively seals against slip sheet 302 substantially completely around composite material 318 so as to thermally enclose composite material 318. During curing, slip sheet 302 and heating blanket 308 are each inductively heated in order to heat composite material 318 from opposite sides of composite material 318.

During curing of composite material 318, heating blanket 308 is inductively heated to cure composite material 318. In some illustrative examples, the power supply for heating blanket 308 is different than the power supply for inductively heating slip sheet 302. Heating blanket 308 comprises a flexible induction coil circuit. The diameter of the induction coil circuit affects the flexibility of the heating blanket 308. The diameter of the conductor, the diameter of the susceptor, and the distance between the conductor and the susceptor affect the diameter of the induction coil circuit. The diameter of induction coil circuit in heating blanket 308 is small enough to allow for a desirable flexibility of heating blanket 308. The dimeter of the induction coil circuit influences the characteristics of the power supply to supply electrical current to the induction coil circuit of heating blanket 308.

Slip sheet 302 is sufficiently rigid to maintain an outer mold line for composite material 318. In some illustrative examples, slip sheet 302 is sufficiently rigid to transport composite material 318 to tool 304.

The induction coil circuit of slip sheet 302 does not have size limitations to meet a desired flexibility. The induction coil circuit of slip sheet 302 can be designed to have a larger diameter than the induction coil circuit of heating blanket 308. Having a greater diameter of the induction coil circuit can change the characteristics of the power supply to send the electrical current to the induction coil circuit. A larger diameter induction coil circuit can utilize a lower frequency power supply.

In some illustrative examples, heating blanket 308 and slip sheet 302 use different power supplies having different characteristics. In some illustrative examples, each of number of rigid cauls 306 utilizes the same power supply. In some illustrative examples, each of number of rigid cauls 306 utilizes the same power supply as either the power supply for heating blanket 308 or the power supply for slip sheet 302.

The illustration of induction curing system 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, number of rigid cauls 306 is optional. In these illustrative examples, heating blanket 308 can be placed directly onto composite material 318.

In some illustrative examples, at least one of number of rigid cauls 306 does not include a respective induction coil circuit. In some of illustrative examples, at least one of number of rigid cauls 306 does not provide heat to cure composite material 318.

Figure 4:
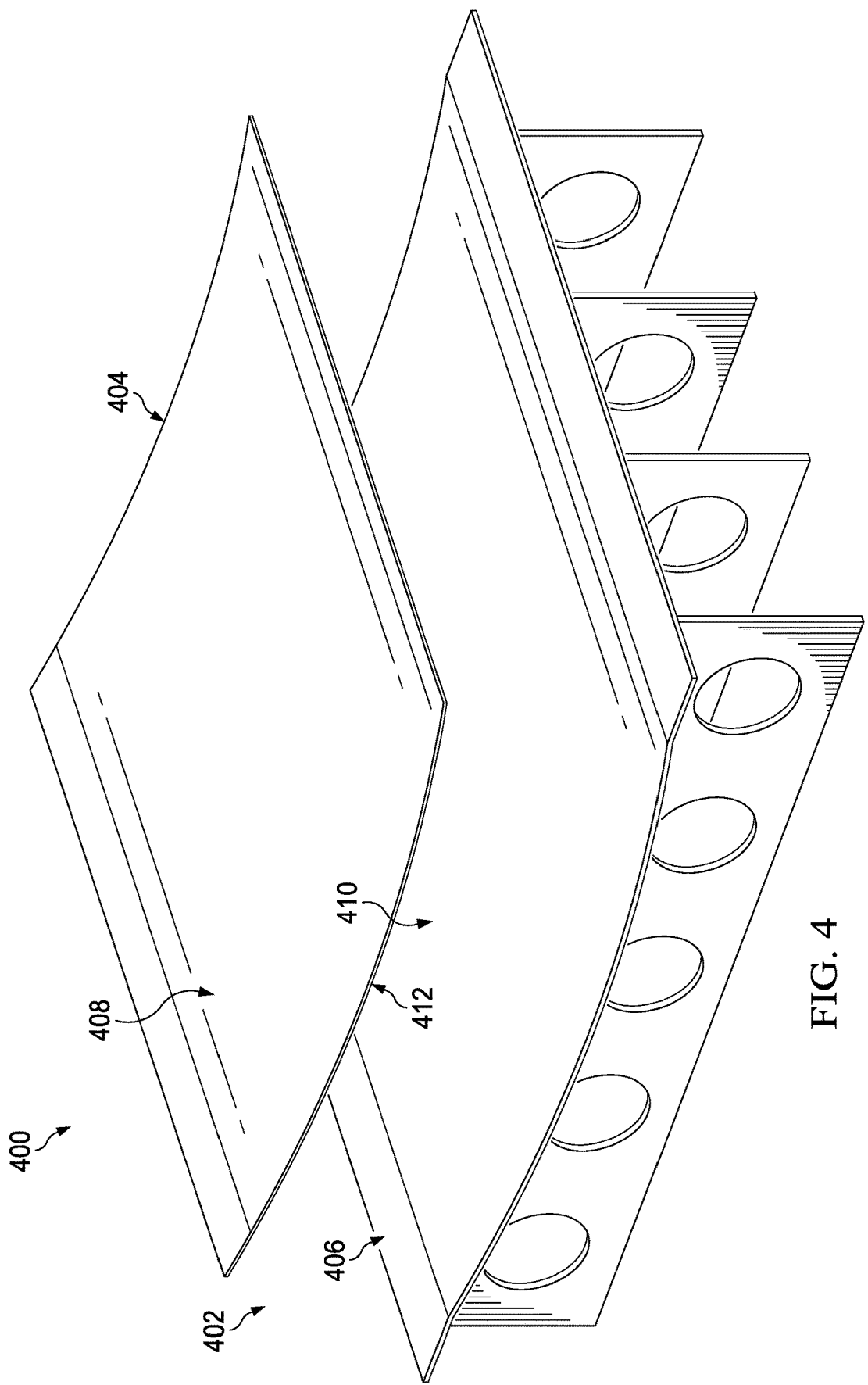
FIG. 4 is an illustration of an induction curing system in accordance with an illustrative embodiment.

Turning now to FIG. 4, an illustration of an induction curing system is depicted in accordance with an illustrative embodiment. In view 400, induction curing system 402 comprises slip sheet 404 and tool 406. Slip sheet 404 is a physical implementation of slip sheet 204 of FIG. 2. Tool 406 is a physical implementation of tool 214 of FIG. 2.

In some illustrative examples, slip sheet 404 is the same as slip sheet 302 of FIG. 3. In some illustrative examples, tool 406 is the same as tool 304 of FIG. 3.

Slip sheet 404 has layup surface 408 configured to receive a composite material (not depicted). Layup surface 408 is configured to form an outer mold line (OML) tooling for the composite material (not depicted). Slip sheet 404 is sufficiently rigid to support the composite material when transporting the composite material to tool 406.

Tool 406 has upper surface 410 configured to receive slip sheet 404. Upper surface 410 is configured to interface with tool interface surface 412 of slip sheet 404.

Tool 406 may be referred to as high heat capacity tooling. Tool 406 is formed of a material configured to withstand the curing temperatures of composite materials. In some illustrative examples, tool 406 is also formed of a material configured to withstand increased pressure. In some illustrative examples, Tool 406 is formed of at least one of a composite material or a metal.

Slip sheet 404 is a non-limiting example of a slip sheet that can be used with tool 406. Different designs of slip sheets can be used in conjunction with tool 406. Each slip sheet can have a layup surface configured to form an outer mold line for a respective composite structure. Each slip sheet will have a tool interface surface configured to interface with upper surface 410 of tool 406. Each slip sheet can have a desired quantity of induction coil circuits configured to cure a composite material on the respective layup surface. By utilizing removable slip sheets, changes to composite structures can be made without manufacturing another expensive high heat capacity tool. Manufacturing another slip sheet may be less expensive than creating another high heat capacity tool.

Figure 5:
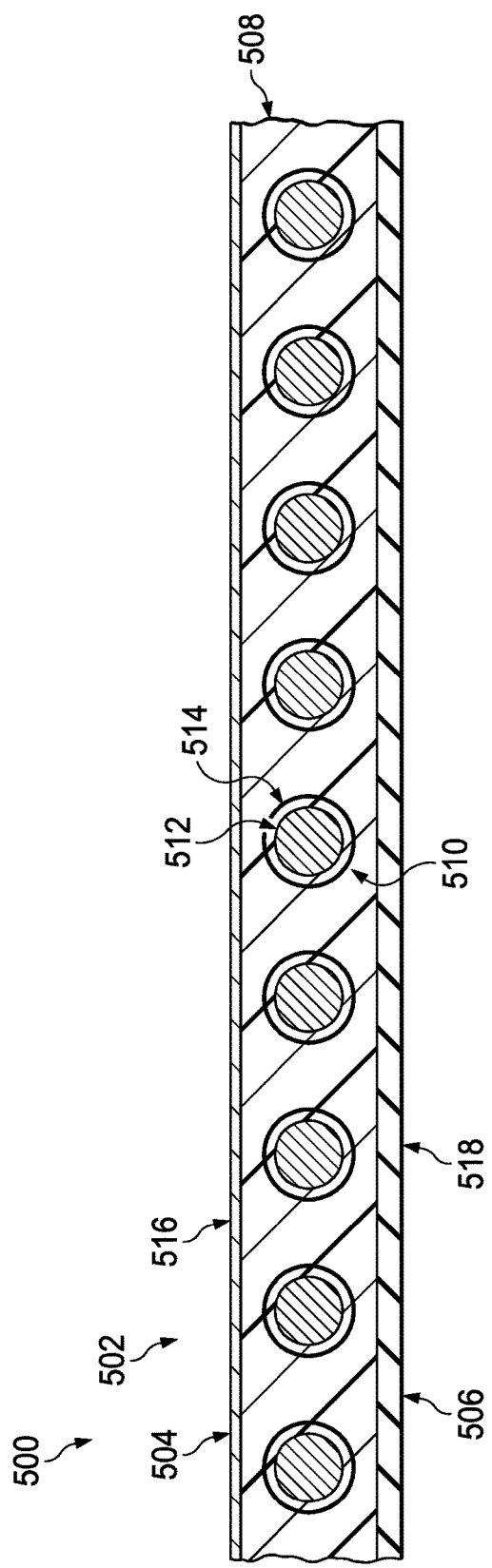
FIG. 5 is an illustration of a cross-sectional view of a slip sheet of an induction curing system in accordance with an illustrative embodiment.

Turning now to FIG. 5, an illustration of a cross-sectional view of a slip sheet of an induction curing system is depicted in accordance with an illustrative embodiment. View 500 is a cross-sectional view through a slip sheet, slip sheet 502. Slip sheet 502 is a physical implementation of slip sheet 204 of FIG. 2. In some illustrative examples, slip sheet 502 is the same as slip sheet 302 of FIG. 3. In some illustrative examples, view 500 of slip sheet 502 is a cross-sectional view through slip sheet 404 of FIG. 4.

Slip sheet 502 comprises layup surface 504 configured to receive a composite material (not depicted), tool interface surface 506 configured to interface with an upper surface of a tool, body 508 extending between layup surface 504 and tool interface surface 506, and induction coil circuit 510 within body 508 of slip sheet 502.

Induction coil circuit 510 is configured to heat layup surface 504 to a temperature sufficient to cure the composite material (not depicted). Induction coil circuit 510 comprises conductor 512 for receiving electrical current and generating a magnetic field in response to the electrical current. Induction coil circuit 510 also comprises susceptor wire 514 wound along at least a portion of a length of conductor 512.

Material and size of conductor 512 is selected based on at least one of the temperature desired to cure the composite material, the dimensions of body 508, and the electrical current to be delivered. In some illustrative examples, conductor 512 is selected to use a power supply having at least one of a lower cost or fewer regulations. For example, diameter and material of conductor 512 can be selected to utilize a power supply providing current with a frequency of 150 kHz or less. In some illustrative examples, diameter and material of conductor 512 can be selected to utilize a power supply providing current with a frequency of 100 kHz or less. Utilizing a power supply providing current with a frequency of 100 kHz or less can reduce the cost of the power supply. In some illustrative examples, diameter and material of conductor 512 can be selected to utilize a power supply providing current with a frequency of 9 kHz or less. A power supply providing current with a frequency of 9 kHz or less may have fewer regulations.

Increasing diameter of conductor 512 reduces the frequency of the current to generate a magnetic current in conductor 512. However, increasing diameter of conductor 512 also decreases the flexibility of conductor 512. In this illustrative example, induction coil circuit 510 is present in slip sheet 502. Slip sheet 502 is configured to be sufficiently rigid to provide an outer mold line for composite material on layup surface 504. Accordingly, conductor 512 and induction coil circuit 510 can be increased in size regardless of flexibility.

Increasing diameter of conductor 512 will also increase the diameter of induction coil circuit 510. In some illustrative examples, the diameter of induction coil circuit 510 is 0.18 inches or greater. The diameter of induction coil circuit 510 of 0.18 inches or greater will allow for a lower cost power supply to provide current to induction coil circuit 510. In some illustrative examples, the diameter of induction coil circuit 510 is 0.38 inches or greater. The diameter of induction coil circuit 510 of 0.38 inches or greater will allow for a power supply below FCC regulated bands (9 Hz) to provide current to induction coil circuit 510. In some illustrative examples, induction coil circuit 510 has a diameter selected to generate heat using a power supply having a frequency below 150 kHz. In some illustrative examples, induction coil circuit 510 has a diameter selected to generate heat using a power supply having a frequency below 100 kHz. In some illustrative examples, induction coil circuit 510 has a diameter selected to generate heat using a power supply having a frequency in the range of 20 kHz-100 kHz. In some illustrative examples, induction coil circuit 510 has a diameter selected to generate heat using a power supply having a frequency below 9 kHz.

When diameter of conductor 512 is increased, the diameter of susceptor wire 514 will also be increased. In some illustrative examples, susceptor wire 514 has a diameter of greater than 0.03 inches. In some illustrative examples, when susceptor wire 514 has a diameter of greater than 0.03 inches, a lower cost power supply can be used to provide current to induction coil circuit 510. In some illustrative examples, susceptor wire 514 has a diameter of greater than 0.05 inches. In some illustrative examples, susceptor wire 514 has a diameter of greater than 0.07 inches. In some illustrative examples, when susceptor wire 514 has a diameter of greater than 0.07 inches, a power supply below FCC regulated bands (9 kHz) can be used to provide current to induction coil circuit 510.

In some illustrative examples, body 508 is referred to as a rigid body. In these illustrative examples, body 508 is configured to support the composite material during transport of the composite material. In these illustrative examples, body 508 is formed of a material and has a sufficient thickness to form a rigid body configured to support the composite material during transport of the composite material. Body 508 is formed of a thermoset composite material. The thermoset composite material of body 508 comprises a thermosetting resin and reinforcing fibers. The reinforcing fibers can include at least one of graphite fibers, fiberglass fibers, or any other desirable reinforcing fiber.

As depicted, slip sheet 502 further comprises metal layer 516 connected to body 508 of slip sheet 502. In this illustrative example, metal layer 516 forms layup surface 504. Material for metal layer 516 is selected such that metal layer 516 increases durability of layup surface 504. Metal layer 516 is configured such that durability of metal layer 516 is greater than the durability of the composite material forming body 508.

As depicted, slip sheet 502 further comprises insulation layer 518 connected to body 508 of slip sheet 502. In this illustrative example, insulation layer 518 forms tool interface surface 506. Insulation layer 224 forms tool interface surface 210 to minimize heat loss to tool 214 and improve the heating efficiency of slip sheet 204. Insulation layer 224 forms tool interface surface 210 to reduce transfer of heat to tool 214. Insulation layer 224 may include any suitable insulation, such as, without limitation, silicone.

The illustration of slip sheet 502 in FIG. 5 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, metal layer 516 is optional. In some illustrative examples, metal layer 516 is not present. In other illustrative examples, layup surface 504 is formed by body 508. In other illustrative examples, layup surface 504 is a coating applied to body 508 to provide at least one of enhanced durability.

As another example, insulation layer 518 is optional. In some illustrative examples, insulation layer 518 is not present. In other illustrative examples, tool interface surface 506 is formed by body 508.

As yet another example, induction coil circuit 510 could instead be formed a woven smart susceptor induction system. In some non-depicted illustrative examples, a smart susceptor system could be a warp and weft within the composite material of body 508.

Figure 6:
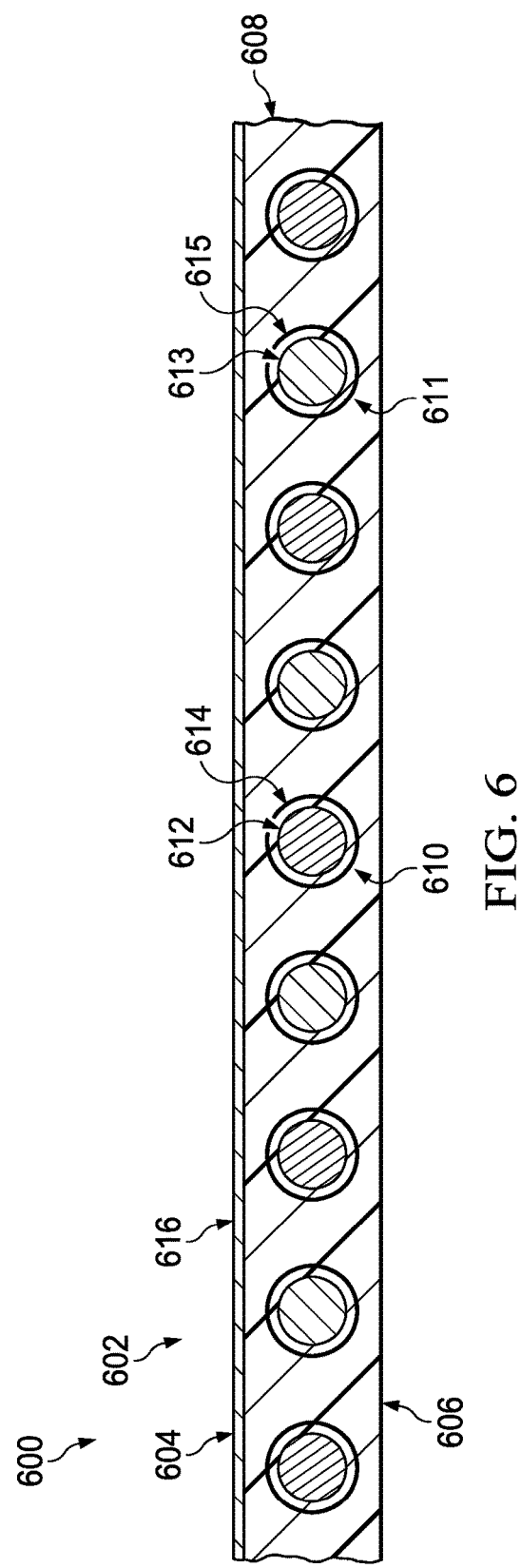
FIG. 6 is an illustration of a cross-sectional view of a slip sheet of an induction curing system in accordance with an illustrative embodiment.

Turning now to FIG. 6, an illustration of a cross-sectional view of a slip sheet of an induction curing system is depicted in accordance with an illustrative embodiment. View 600 is a cross-sectional view through a slip sheet, slip sheet 602. Slip sheet 602 is a physical implementation of slip sheet 204 of FIG. 2. In some illustrative examples, slip sheet 602 is the same as slip sheet 302 of FIG. 3. In some illustrative examples, view 600 of slip sheet 602 is a cross-sectional view of slip sheet 404 of FIG. 4.

Slip sheet 602 is similar to slip sheet 502 of FIG. 5, but with two different types of induction coil circuits. By supplying two different induction coil circuits, slip sheet 602 is configured to heat to two different temperatures.

Slip sheet 602 comprises layup surface 604 configured to receive a composite material (not depicted), tool interface surface 606 configured to interface with an upper surface of a tool, body 608 extending between layup surface 604 and tool interface surface 606, first induction coil circuit 610 within body 608 of slip sheet 602, and second induction coil circuit 611 within body 608 of slip sheet 602.

First induction coil circuit 610 is configured to heat layup surface 604 to a temperature sufficient to cure the composite material (not depicted). First induction coil circuit 610 comprises conductor 612 for receiving electrical current from a first power supply and generating a magnetic field in response to the electrical current. First induction coil circuit 610 also comprises susceptor wire 614 wound along at least a portion of a length of conductor 612.

Material and size of conductor 612 is selected based on at least one of the temperature desired to cure the composite material, the dimensions of body 608, and the electrical current to be delivered. In some illustrative examples, conductor 612 is selected to use a first power supply having at least one of a lower cost or fewer regulations.

Second induction coil circuit 611 is configured to heat layup surface 604 to a layup temperature for the composite material (not depicted). In some illustrative examples, second induction coil circuit 611 is configured receive an electrical current from a second power supply separate from the first power supply. In some illustrative examples, second induction coil circuit 611 is configured receive an electrical current from the first power supply. Second induction coil circuit 611 enables operation of slip sheet 204 as a heated platform for layup of composite material 208. Second induction coil circuit 611 comprises conductor 613 for receiving electrical current from a power supply and generating a magnetic field in response to the electrical current. Second induction coil circuit 611 also comprises susceptor wire 615 wound along at least a portion of a length of conductor 613.

Material and size of each component of second induction coil circuit 611 can be selected based on the considerations discussed with respect to first induction coil circuit 610. For example, the selection of the size and type of conductor 613 can take into account at least one of the temperature desired to heat slip sheet 602 for composite layup, the dimensions of body 608, and the electrical current to be delivered.

In some illustrative examples, body 608 is referred to as a rigid body. In these illustrative examples, body 608 is configured to support the composite material during transport of the composite material. In these illustrative examples, body 608 is formed of a material and has a sufficient thickness to form a rigid body configured to support the composite material during transport of the composite material. Body 608 is formed of a thermoset composite material. The thermoset composite material of body 608 comprises a thermosetting resin and reinforcing fibers. The reinforcing fibers can include at least one of graphite fibers, fiberglass fibers, or any other desirable reinforcing fiber.

As depicted, slip sheet 602 further comprises metal layer 616 connected to body 608 of slip sheet 602. In this illustrative example, metal layer 616 forms layup surface 604. Material for metal layer 616 is selected such that metal layer 616 increases durability of layup surface 604. Metal layer 616 is configured such that durability of metal layer 616 is greater than the durability of the composite material forming body 608. As depicted, tool interface surface 606 of slip sheet 602 is formed by body 608 of slip sheet 602.

The illustration of slip sheet 602 in FIG. 6 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, metal layer 616 is optional. In some illustrative examples, metal layer 616 is not present. In other illustrative examples, layup surface 604 is formed by body 608. In other illustrative examples, layup surface 604 is a coating applied to body 608 to provide at least one of enhanced durability.

As another example, an insulation layer could be added. In some illustrative examples, an insulation layer forms tool interface surface 606.

As yet another example, first induction coil circuit 610 and second induction coil circuit 611 could be positioned in body 608 differently than depicted. In one non-depicted illustrative example, second induction coil circuit 611 can be positioned above first induction coil circuit 610.

Figure 7:
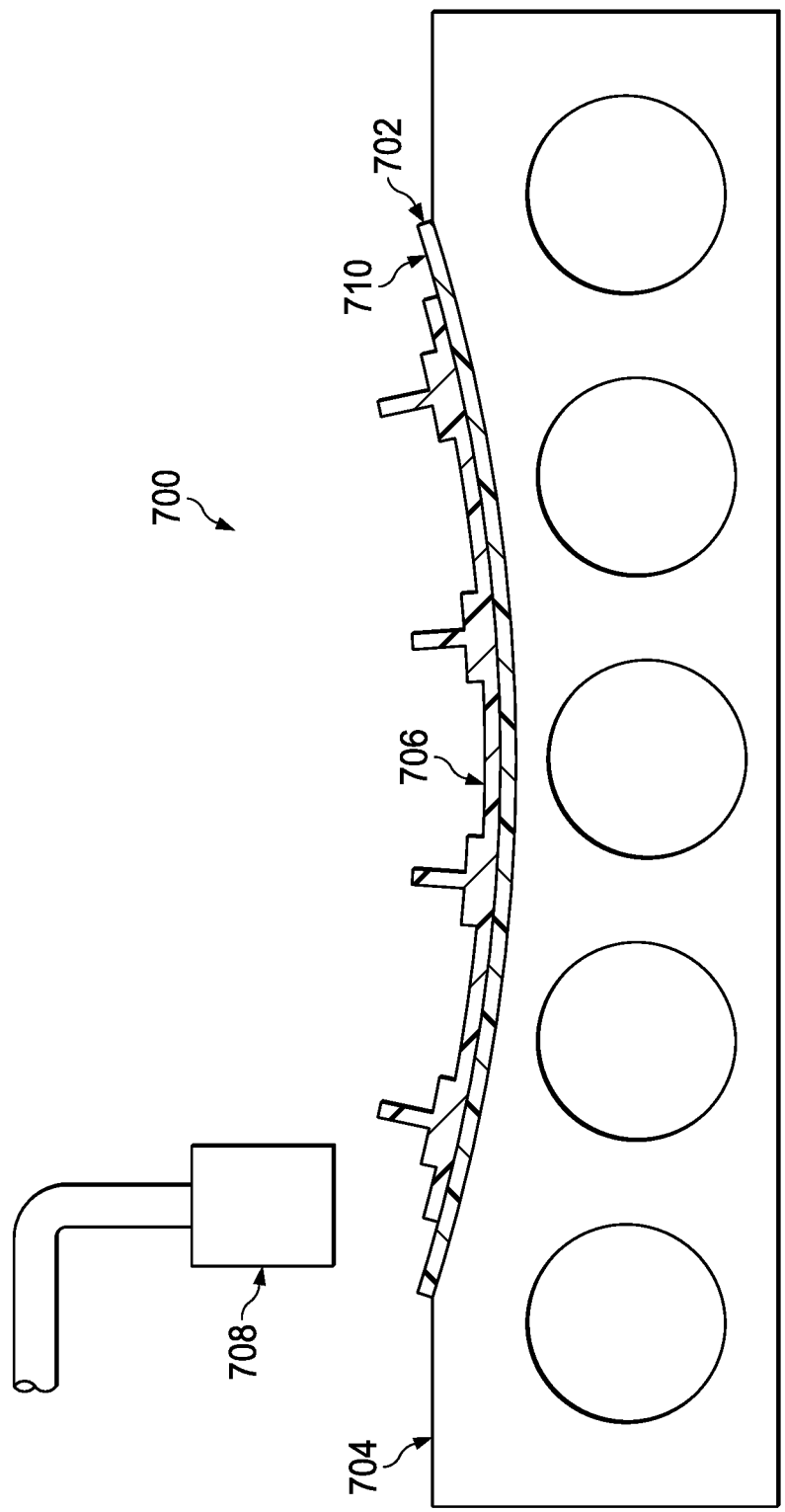
FIG. 7 is an illustration of a cross-sectional view of a composite material laid up on a slip sheet on a layup support in accordance with an illustrative embodiment.

In some illustrative examples, induction coil circuit 610 and second induction coil circuit 611 have different Curie temperatures. In some illustrative examples, second induction coil circuit 611 comprises a second conductor, conductor 613, and a second susceptor wire, susceptor wire 615. Susceptor wire 615 has a second Curie temperature, wherein the first Curie temperature of susceptor wire 614 is different than the second Curie temperature. In some illustrative examples, the first Curie temperature is a curing temperature and the second Curie temperature is a layup temperature FIGS. 7-11 present one illustrative example of layup, transfer, and curing of a composite material, composite material 706, on slip sheet 702. Turning now to FIG. 7, an illustration of a cross-sectional view of a composite material laid up on a slip sheet on a layup support is depicted in accordance with an illustrative embodiment. In view 700 slip sheet 702 is positioned on layup support 704 to receive composite material 706. Automated lamination equipment 708 lays down composite material 706 on layup surface 710 of slip sheet 702. Layup surface 710 of slip sheet 702 acts as an outer mold line for composite material 706.

Slip sheet 702 is a physical implementation of slip sheet 204 of FIG. 2. Composite material 706 is a physical implementation of composite material 208 of FIG. 2. Layup support 704 is a physical implementation of layup support 262. In some illustrative examples, layup support 704 is not a "high heat capacity tool". When layup support 704 is not a "high heat capacity tool," layup support 704 has a lower cost than a cure tool.

Figure 8:
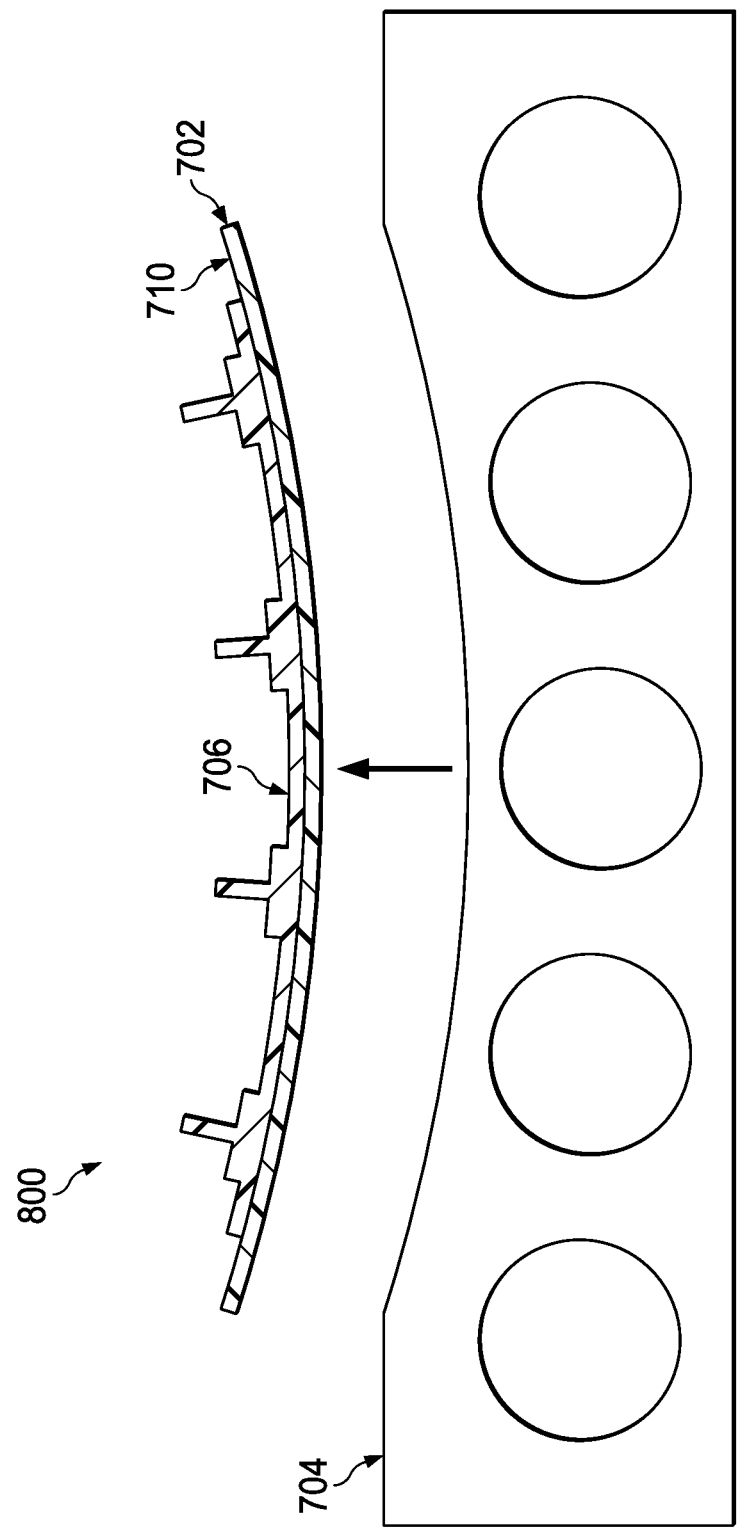
FIG. 8 is an illustration of a cross-sectional view of removing a composite material on a slip sheet from a layup support in accordance with an illustrative embodiment.

Turning now to FIG. 8, an illustration of a cross-sectional view of removing a composite material on a slip sheet from a layup support is depicted in accordance with an illustrative embodiment. In view 800, slip sheet 702 is removed from layup support 704.

As can be seen in view 800, slip sheet 702 is sufficiently rigid to support composite material 706. During transport of composite material 706, layup surface 710 of slip sheet 702 maintains its shape. During transport of composite material 706, the shape of composite material 706 is maintained.

By removing slip sheet 702 after laying down composite material 706 and prior to curing composite material 706, layup support 704 is available to receive another slip sheet. By removing slip sheet 702 upon finishing layup of composite material 706, downtime of automated lamination equipment 708 is reduced. By removing slip sheet 702 upon finishing layup of composite material 706, efficiency of automated lamination equipment 708 is increased. By removing slip sheet 702 upon finishing layup of composite material 706, the throughput of the manufacturing system is increased. A quantity of composite parts manufactured over time will be increased by decreasing downtime of automated lamination equipment 708.

Figure 9:
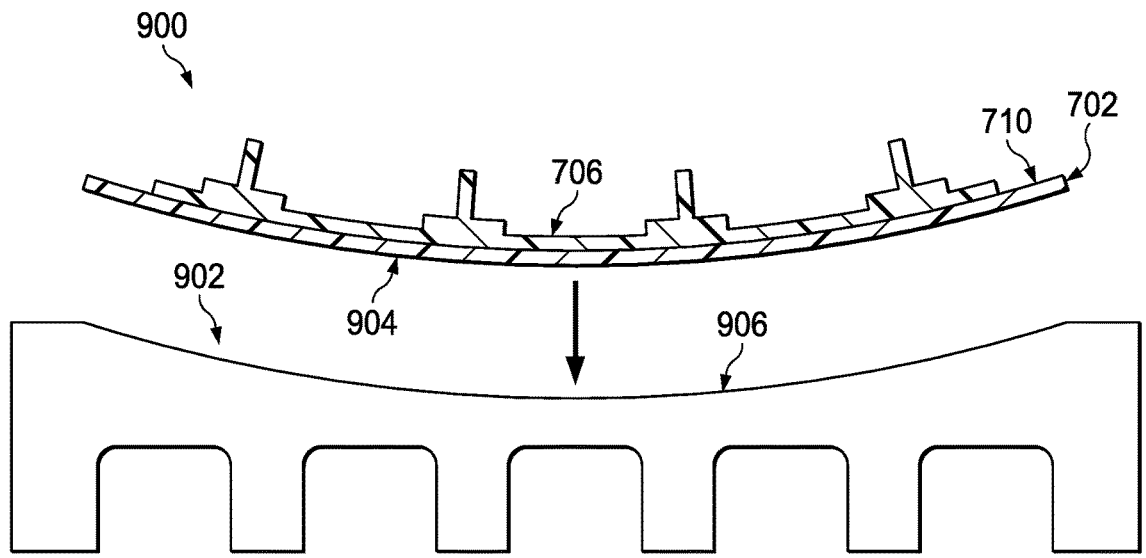
FIG. 9 is an illustration of a cross-sectional view of moving a composite material on a slip sheet from a layup support in accordance with an illustrative embodiment.

Turning now to FIG. 9, an illustration of a cross-sectional view of moving a composite material on a slip sheet from a layup support is depicted in accordance with an illustrative embodiment. In view 900, slip sheet 702 carrying composite material 706 is lowered onto tool 902. Tool 902 is a curing tool. Tool 902 is a "high heat capacity tool." Slip sheet 702 will be lowered until tool interface surface 904 of slip sheet 702 is in contact with upper surface 906 of tool 902. After interface surface 904 of slip sheet 702 is in contact with upper surface 906 of tool 902, slip sheet 702 is secured to tool 902.

Figure 10:
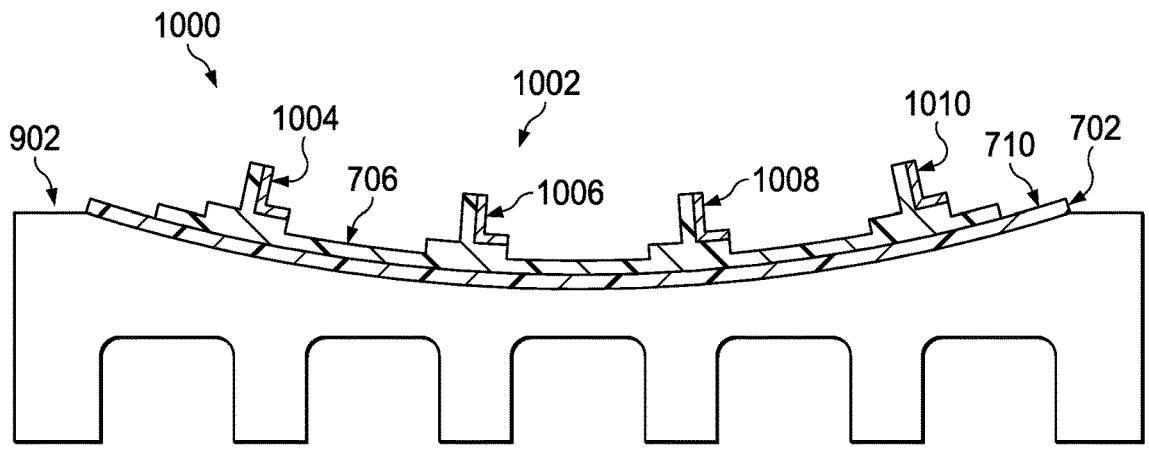
FIG. 10 is an illustration of a cross-sectional view of placing rigid cauls in an induction curing system in accordance with an illustrative embodiment.

Turning now to FIG. 10, an illustration of a cross-sectional view of placing rigid cauls in an induction curing system is depicted in accordance with an illustrative embodiment. In view 1000 slip sheet 702 has been secured to tool 902.

In view 1000, number of rigid cauls 1002 has been placed onto composite material 706. Number of rigid cauls 1002 is a physical implementation of number of rigid cauls 252 of FIG. 2. As depicted, number of rigid cauls 1002 includes rigid caul 1004, rigid caul 1006, rigid caul 1008, and rigid caul 1010. As depicted, each of number of rigid cauls 1002 includes at least one respective inductive circuit. Each of number of rigid cauls 1002 can be inductively heated by at least one inductive circuit present in the respective rigid caul. Number of rigid cauls 1002 may be referred to as a number of inductively heated rigid cauls.

Figure 11:
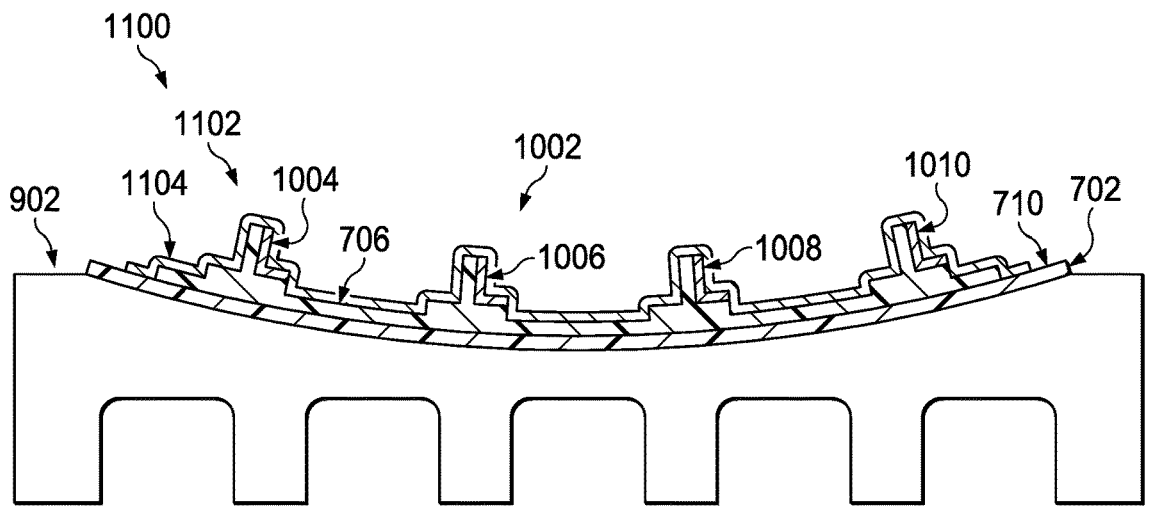
FIG. 11 is an illustration of a cross-sectional view of positioning a heated blanket in an induction curing system in accordance with an illustrative embodiment.

Turning now to FIG. 11, an illustration of a cross-sectional view of positioning a heated blanket in an induction curing system is depicted in accordance with an illustrative embodiment. In view 1100, heating components of induction curing system 1102 have been positioned. In view 1100, induction curing system 1102 comprises slip sheet 702, number of rigid cauls 1002, and heating blanket 1104. Heating blanket 1104 overlies and thermally contacts a second side of composite material 706. Number of rigid cauls 1002 also contact the second side of composite material 706. The periphery of heating blanket 1104 extends outwardly beyond the edges of the composite material 706 and overlies a portion of layup surface 710 of slip sheet 702.

The illustrations of components of induction curing system 1102 in FIGS. 7-11 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the size, shape, curvature, locations of stiffeners, quantity of stiffeners, and shape of stiffeners in composite material 706 are not limited to those depicted in composite material 706. Composite material 706 can have any desirable size, shape, and curvature, and any desirable locations, quantities, and shape of stiffeners.

As another example, in FIGS. 10 and 11, number of rigid cauls 1002 and heating blanket 1104 are placed onto composite material 706 while slip sheet 702 is present on tool 902. In other illustrative examples, at least one of number of rigid cauls 1002 or heating blanket 1104 are placed onto composite material 706 prior to placing slip sheet 702 onto tool 902. In some illustrative examples, number of rigid cauls 1002 is placed onto composite material 706 prior to removing slip sheet 702 from layup support 704. In some illustrative examples, heating blanket 1104 is placed onto composite material 706 prior to removing slip sheet 702 from layup support 704.

In some illustrative examples, slip sheet 702 is transferred to an intermediary tool between layup support 704 and tool 902. In some illustrative examples, while slip sheet 702 is present on an intermediary tool, at least one of number of rigid cauls 1002 or heating blanket 1104 are placed onto composite material 706 prior to placing slip sheet 702 onto tool 902. In some illustrative examples, number of rigid cauls 1002 is placed onto composite material 706 while slip sheet 702 is present on an intermediary tool. In some illustrative examples, heating blanket 1104 is placed onto composite material 706 while slip sheet 702 is present on an intermediary tool.

In other illustrative examples, heating blanket 1104 may extend over slip sheet 702 and overlies a portion of and is in contact with tool 902. In some illustrative examples, at least one of number of rigid cauls 1002 or heating blanket 1104 is optional.

Figure 12:
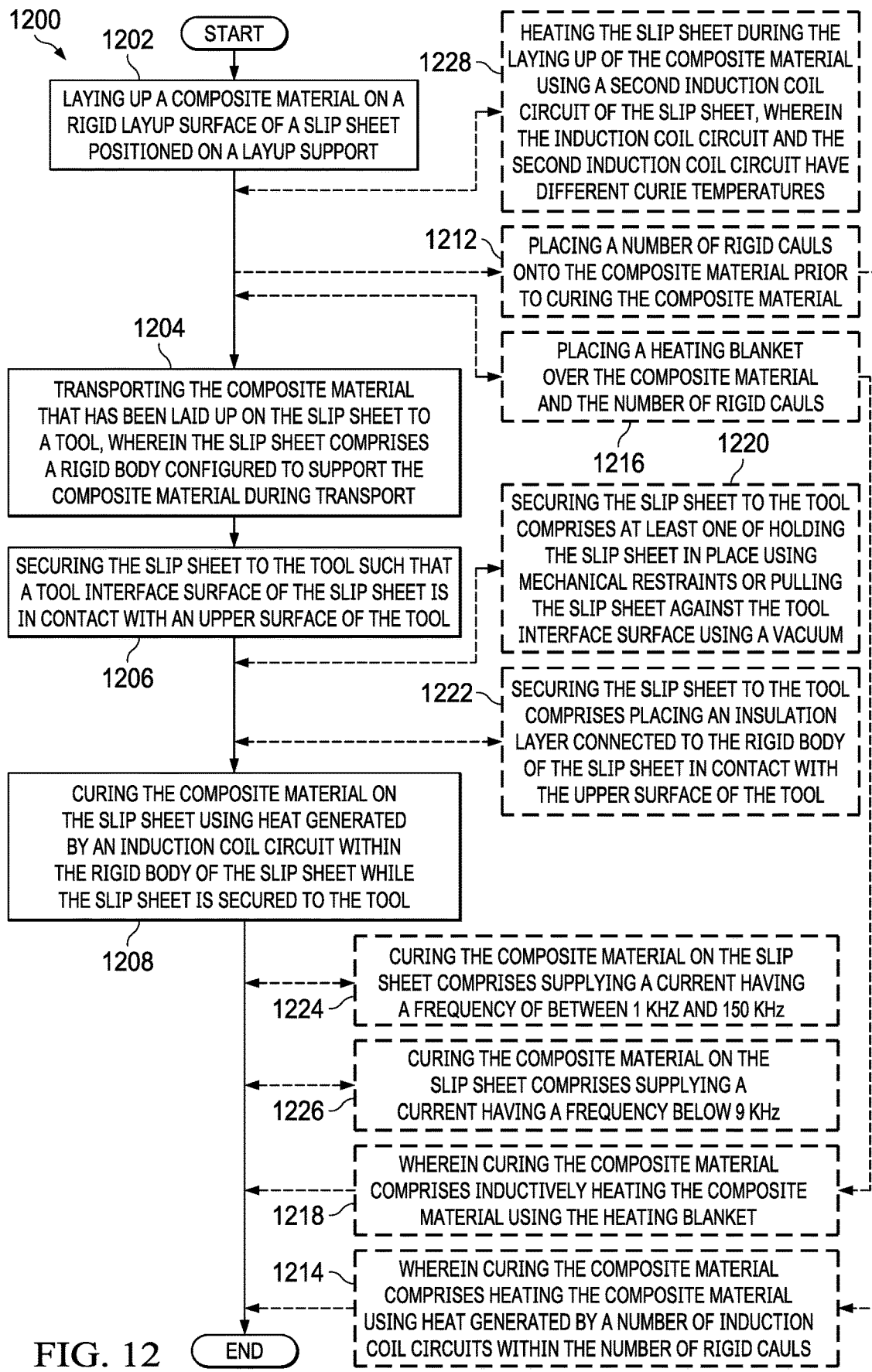
FIG. 12 is an illustration of a flowchart of a method of forming a composite part in accordance with an illustrative embodiment.

Turning now to FIG. 12, an illustration of a flowchart of a method of forming a composite part is depicted in accordance with an illustrative embodiment. Method 1200 can be performed to manufacture a composite part of aircraft 100 of FIG. 1. Method 1200 can be performed using components of induction curing system 202 of FIG. 2. Method 1200 can be performed using components of induction curing system 300 of FIG. 3. Method 1200 can be performed using components of induction curing system 402 of FIG. 4. Method 1200 can be performed using slip sheet 502 of FIG. 5. Method 1200 can be performed using slip sheet 602 of FIG. 6. Method 1200 can be performed using components of induction curing system 1102 shown in FIGS. 7-11. Method 1200 can be performed as discussed in FIGS. 7-11.

Method 1200 lays up a composite material on a layup surface of a slip sheet positioned on a layup support (operation 1202). The layup surface of the slip sheet is formed of at least one of the material of the body of the slip sheet or an additional material connected to the body of the slip sheet. In some illustrative examples, the layup surface of the slip sheet is a metal layer connected to the body of the slip sheet. In some illustrative examples, the layup surface is a coating applied to the body of the slip sheet. In some illustrative examples, the layup surface of the slip sheet is formed of a composite material of the body of the slip sheet.

Method 1200 transports the composite material that has been laid up on the slip sheet to a tool, wherein the slip sheet comprises a rigid body configured to support the composite material during transport (operation 1204). The slip sheet is sufficiently rigid to maintain the shape of the composite material as the composite material is transported.

Method 1200 secures the slip sheet to the tool such that a tool interface surface of the slip sheet is in contact with an upper surface of the tool (operation 1206). The tool interface surface is formed of at least one of the material of the body of the slip sheet or an additional material connected to the body of the slip sheet. In some illustrative examples, the tool interface surface of the slip sheet is formed of an insulation layer. In some illustrative examples, the tool interface surface is formed of a composite material of the body of the slip sheet.

Method 1200 cures the composite material on the slip sheet using heat generated by an induction coil circuit within the rigid body of the slip sheet while the slip sheet is secured to the tool (operation 1208). The induction coil circuit in the rigid body generates heat using an electrical current. More specifically, a conductor generates a magnetic field in response to the electrical current and a susceptor generates heat in response to the magnetic field. Afterwards, method 1200 may terminate.

In some illustrative examples, method 1200 places a number of rigid cauls onto the composite material prior to curing the composite material (operation 1212). In some illustrative examples, after performing operation 1212, curing the composite material comprises heating the composite material using heat generated by a number of induction coil circuits within the number of rigid cauls (operation 1214).

In some illustrative examples, method 1200 places a heating blanket over the composite material and the number of rigid cauls (operation 1216). In some illustrative examples, after performing operation 1216, curing the composite material comprises inductively heating the composite material using the heating blanket (operation 1218).

In some illustrative examples, securing the slip sheet to the tool comprises at least one of holding the slip sheet in place using mechanical restraints and pulling the slip sheet against the tool interface surface using a vacuum (operation 1220). In some illustrative examples, securing the slip sheet to the tool comprises placing an insulation layer connected to the rigid body of the slip sheet in contact with the upper surface of the tool (operation 1222).

In some illustrative examples, curing the composite material on the slip sheet comprises supplying a current having a frequency of between 1 kHz and 150 kHz (operation 1224). In some illustrative examples, curing the composite material on the slip sheet comprises supplying a current having a frequency below 9 kHz (operation 1226). In some illustrative examples, method 1200 further comprises heating the slip sheet during the laying up of the composite material using a second induction coil circuit of the slip sheet, wherein the induction coil circuit and the second induction coil circuit have different Curie temperatures (operation 1228).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 1212 through operation 1218 may be optional.

Figure 13:
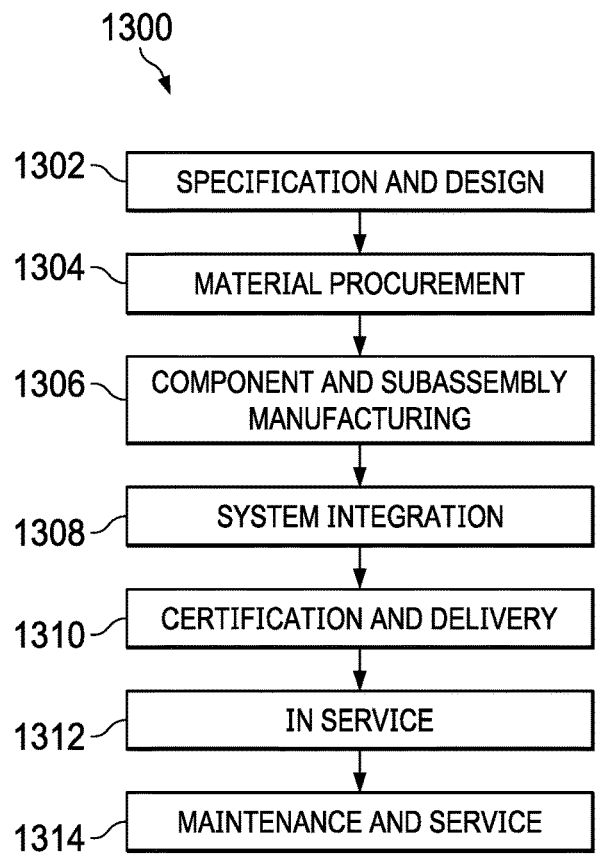
FIG. 13 is an illustration of an aircraft manufacturing and service method in a form of a block diagram in accordance with an illustrative embodiment.
Figure 14:
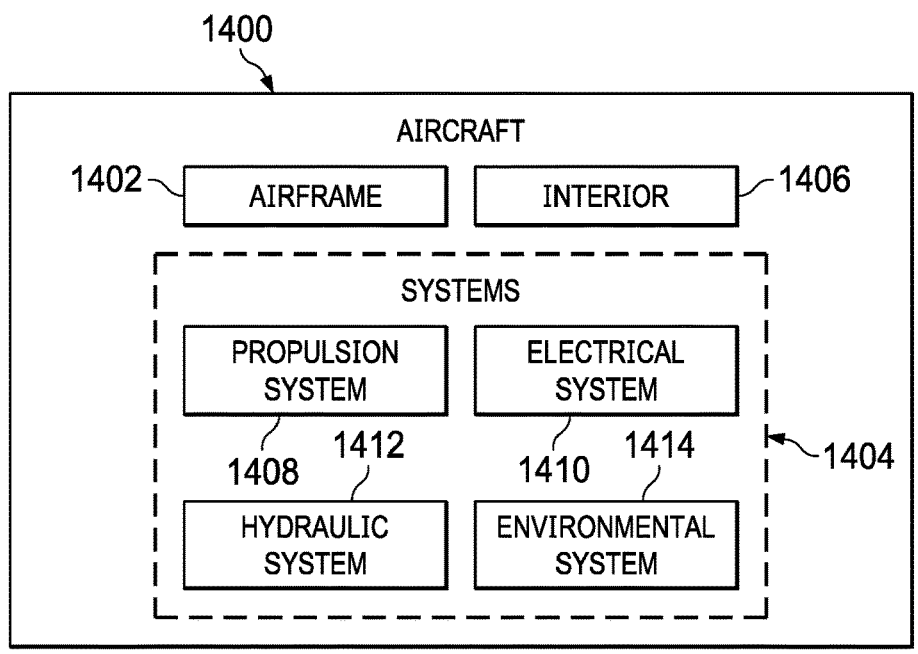
FIG. 14 is an illustration of an aircraft in a form of a block diagram in which an illustrative embodiment may be implemented.

Illustrative embodiments of the present disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, or other maintenance and service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 of FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included.

Apparatuses and methods embodied herein may be employed during at least one of the stages of aircraft manufacturing and service method 1300. One or more illustrative embodiments may be manufactured or used during at least one of component and subassembly manufacturing 1306, system integration 1308, in service 1312, or maintenance and service 1314 of FIG. 13.

A portion of airframe 1402 of aircraft 1400 can be formed by method 1200. Method 1200 can be performed during component and subassembly manufacturing 1306. Induction curing system 202 can be used to form a composite structure during component and subassembly manufacturing 1306. A composite structure formed using method 1200 is present and utilized during in service 1312. Method 1200 can be performed during maintenance and service 1314 to form a replacement part.

The illustrative examples provide advantages in the manufacture of composite structures. The tool surface type self-heated slip sheet provides rapid and precise component curing. This more nimble process helps to accommodate accelerated production rates. The inductively heated slip sheets provide a faster and more efficient application of heat than an autoclave or oven.

Slip sheets can act as a lay-up surface and be used to transfer the lay-up from a lower cost lay-up mandrel to the higher cost curing tool thereby eliminating cost.

Composite material is laid up on slip sheet using low-cost lay-up mandrel. The lay-up is transferred to a lay-up curing tool and the slip-sheet is secured for processing of the composite material. The tool with the slip sheet and composite material can be moved into a pressure vessel. A number of heating blankets and slip sheet are connected to the required induction power supplies. The composite layup can be vacuum bagged. Heating of the slip sheets and blankets is initiated.

The composite material is then rapidly heated to the curing step while pneumatic pressure is applied as dictated by the appropriate cure kinetics model. The smart susceptor provides thermal leveling at the prescribed cure temperature. Lite circulation of the ambient temperature gaseous pressurization medium in the cure vessel sweeps away any exothermic evolved heat during the cure while the smart susceptors continue to drive the temperature of the slip sheets and blankets to the desired cure temperature. As used herein, a smart susceptor is constructed of a material, or materials, that generate heat efficiently until reaching a threshold (i.e., Curie) temperature.

Once the desired state of cure is achieved the composite part can be rapidly cooled down since the body of the tool is not heated and the gas in the pressure vessel is at ambient temperature. The composite part and tool are then removed from the pressure vessel and debagging occurs with the parts then sent to inspection and trim.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An induction curing system comprising:
 a slip sheet comprising:
  a layup surface configured to receive a composite material;
  a tool interface surface configured to interface with an upper surface of a tool;

a rigid body extending between the layup surface and the tool interface surface, the rigid body configured to support the composite material during transport of the composite material;

an induction coil circuit within the rigid body of the slip sheet, the induction coil circuit configured to heat the layup surface to a temperature sufficient to cure the composite material, the induction coil circuit having a diameter selected to generate heat using a power supply having a frequency below 150 kHz; and a power supply coupled with the induction coil circuit, the power supply selected based on the diameter of the induction coil circuit, wherein the induction coil circuit comprises a conductor and a susceptor wire having a first Curie temperature, and wherein the slip sheet further comprises a second induction coil circuit, and wherein the second induction coil circuit comprises a second conductor and a second susceptor wire having a second Curie temperature, wherein the first Curie temperature is different than the second Curie temperature.

2. The induction curing system of claim 1, wherein the slip sheet further comprises an insulation layer connected to the rigid body of the slip sheet, wherein the insulation layer forms the tool interface surface.

3. The induction curing system of claim 1 further comprising:
a rigid caul, wherein the rigid caul comprises a caul induction coil circuit within a rigid body of the rigid caul, the caul induction coil circuit configured to heat the rigid caul.

4. The induction curing system of claim 1 further comprising:
a heating blanket conformable to the composite material, the heating blanket comprising an induction heating circuit.

5. The induction curing system of claim 1 further comprising:
the tool, wherein the tool further comprises a vacuum system configured to restrain the slip sheet relative to the upper surface of the tool.

6. The induction curing system of claim 1, wherein the power supply has a frequency below 9 kHz.

7. The induction curing system of claim 1, wherein the upper surface of the tool is configured to receive composite material.

8. The induction curing system of claim 1, wherein the slip sheet further comprises a metal layer connected to the rigid body of the slip sheet, wherein the metal layer forms the layup surface.

9. The induction curing system of claim 8, wherein the rigid body is formed of a composite material.

10. The induction curing system of claim 1, wherein the induction coil circuit comprises:
a conductor for receiving electrical current and generating a magnetic field in response to the electrical current; and
a susceptor wire spirally wound along at least a portion of a length of the conductor and comprising a succession of wire wraps defining gaps therebetween such that a circumferential location on each wire wrap is spaced apart from an adjacent wire wrap at the same circumferential location, the magnetic field passing through the gaps between the wire wraps and thereby promoting flow of eddy currents within the wire, the wire being comprised of magnetic material having a Curie temperature, the wire being inductively heated in response to the magnetic field.

11. The induction curing system of claim 1, wherein the first Curie temperature is a curing temperature and wherein the second Curie temperature is a layup temperature.

12. An induction curing system comprising:
a slip sheet comprising:
a layup surface configured to receive a composite material;
a tool interface surface configured to interface with an upper surface of a tool;
a body extending between the layup surface and the tool interface surface;
an induction coil circuit within the body of the slip sheet, the induction coil circuit configured to heat the layup surface to a temperature sufficient to cure the composite material, the induction coil circuit comprising a conductor for receiving electrical current and generating a magnetic field in response to the electrical current and a susceptor wire wound along at least a portion of a length of the conductor, the susceptor wire having a diameter of greater than 0.05 inches, the induction coil circuit having a diameter selected to generate heat using a power supply having a frequency below 150 kHz; and
a power supply coupled with the induction coil circuit, the power supply selected based on the diameter of the induction coil circuit,
wherein the induction coil circuit comprises a conductor and a susceptor wire having a first Curie temperature, and wherein the slip sheet further comprises a second induction coil circuit, and wherein the second induction coil circuit comprises a second conductor and a second susceptor wire having a second Curie temperature, wherein the first Curie temperature is different than the second Curie temperature.

13. The induction curing system of claim 12 further comprising:
a heating blanket conformable to the composite material, the heating blanket comprising an induction heating circuit.

14. The induction curing system of claim 13, wherein the induction coil circuit of the slip sheet is configured to generate heat in response to a current having a first range of frequencies, wherein the induction heating circuit of the heating blanket is configured to generate heat in response to a current having a second range of frequencies, and wherein the first range of frequencies is outside and separate from the second range of frequencies.

15. The induction curing system of claim 14, wherein the first range of frequencies is below 9 kHz.

16. The induction curing system of claim 12, wherein the body is a rigid body, and wherein the rigid body is sufficiently rigid to support the composite material during transport of the composite material.

17. The induction curing system of claim 12, wherein the induction coil circuit comprises:
a conductor for receiving electrical current and generating a magnetic field in response to the electrical current; and
a susceptor wire spirally wound along at least a portion of a length of the conductor and comprising a succession of wire wraps defining gaps therebetween such that a circumferential location on each wire wrap is spaced apart from an adjacent wire wrap at the same circumferential location, the magnetic field passing through the gaps between the wire wraps and thereby promoting flow of eddy currents within the wire, the wire being comprised of magnetic material having a Curie temperature, the wire being inductively heated in response to the magnetic field.

18. The induction curing system of claim 12, wherein the first Curie temperature is a curing temperature and wherein the second Curie temperature is a layup temperature.

19. An induction curing system comprising:
a slip sheet comprising:
- a layup surface configured to receive a composite material;
- a tool interface surface configured to interface with an upper surface of a tool;
- a body extending between the layup surface and the tool interface surface;
- an induction coil circuit within the body of the slip sheet, the induction coil circuit configured to heat the layup surface to a temperature sufficient to cure the composite material, the induction coil circuit comprising a conductor for receiving electrical current and generating a magnetic field in response to the electrical current and a susceptor wire wound along at least a portion of a length of the conductor, the susceptor wire having a diameter of greater than 0.05 inches, the induction coil circuit having a diameter selected to generate heat using a power supply having a frequency below 150 kHz;
a power supply coupled with the induction coil circuit, the power supply selected based on the diameter of the induction coil circuit; and
wherein the induction coil circuit comprises a conductor and a susceptor wire having a first Curie temperature, and wherein the slip sheet further comprises a second induction coil circuit, and wherein the second induction coil circuit comprises a second conductor and a second susceptor wire having a second Curie temperature, wherein the first Curie temperature is different than the second Curie temperature,
wherein the body is a rigid body, and wherein the rigid body is sufficiently rigid to support the composite material during transport of the composite material and
wherein the first Curie temperature is a curing temperature and wherein the second Curie temperature is a layup temperature.

20. The induction curing system of claim 19 further comprising:
a heating blanket conformable to the composite material, the heating blanket comprising an induction heating circuit.

21. The induction curing system of claim 20, wherein the induction coil circuit of the slip sheet is configured to generate heat in response to a current having a first range of frequencies, wherein the induction heating circuit of the heating blanket is configured to generate heat in response to a current having a second range of frequencies, and wherein the first range of frequencies is outside and separate from the second range of frequencies.

22. The induction curing system of claim 21, wherein the first range of frequencies is below 9 kHz.

23. The induction curing system of claim 19, wherein the induction coil circuit comprises:
a conductor for receiving electrical current and generating a magnetic field in response to the electrical current; and
a susceptor wire spirally wound along at least a portion of a length of the conductor and comprising a succession of wire wraps defining gaps therebetween such that a circumferential location on each wire wrap is spaced apart from an adjacent wire wrap at the same circumferential location, the magnetic field passing through the gaps between the wire wraps and thereby promoting flow of eddy currents within the wire, the wire being comprised of magnetic material having a Curie temperature, the wire being inductively heated in response to the magnetic field.

\* \* \* \* \*